United States Patent [19]
Molloy

[11] Patent Number: 5,787,234
[45] Date of Patent: Jul. 28, 1998

[54] SYSTEM AND METHOD FOR REPRESENTING AND RETRIEVING KNOWLEDGE IN AN ADAPTIVE COGNITIVE NETWORK

[76] Inventor: Bruce G. Molloy, 40 Malapardis Rd., Morris Plains, N.J. 07950

[21] Appl. No.: 872,791

[22] Filed: Jun. 10, 1997

Related U.S. Application Data

[63] Continuation of Ser. No. 263,644, Jun. 22, 1994, abandoned.

[51] Int. Cl.$^6$ .......................... G06F 15/18; G06F 17/30
[52] U.S. Cl. ................... 395/51; 706/54; 706/60
[58] Field of Search ................................. 395/51

[56] References Cited

U.S. PATENT DOCUMENTS

| | | | |
|---|---|---|---|
| 5,224,206 | 6/1993 | Simoudis | 395/77 |
| 5,267,156 | 11/1993 | Nomiyama | 395/760 |
| 5,319,739 | 6/1994 | Yoshiura et al. | 395/51 |

OTHER PUBLICATIONS

*Encyclopedia of Computer Science*, Van Nostrand Reinhold (1993), "Neural Networks", pp. 929–934.
*Encyclopedia of Computer Science*, Van Nostrand Reinhold (1993), "Expert Systems", pp. 536–540.
H. Shimazu, et al., "Retrieving Cases from RElational Data–Bases: Another Stride Towards Corporate–Wide Case–Base Systems," Proc. Thirteenth Int'l Joint Conf. on Articial Intelligence, vol. 2, pp. 909–914., Aug. 1993.
E. Charniak, et al., Artificial Intelligence Programming—second edition, Lawrence Erlbaum Assoc., pp. 276–287, Dec. 1987.
L. Becker and K. Jazayeri, "A Connectionist Approach to Case–Based Reasoning," Proc.: Case–Based Reasoning Workshop, pp. 213–217., May 1989.
M. Goodman, "CBR in Battle Planning," Proc.: Case–Based Reasoning Workshop, pp. 264–269, May 1989.
P. thrift, "A Neural Network Model for Case–Based Reasoninig," Proc.: Case–Based Reasoning Workshop, pp. 334–337., May 1989.
D. Shafer, "CBR Express—Getting Down to Cases," PC AI, pp. 42–45., Jul. 1991.
R. Barletta, "An Introduction to Case–Based Reasoning," AI Expert, pp. 43–49., Aug. 1991.
B. Francis, "Downsizing the help desk (the latest technology is on microcomputers, not mainframes)," Datamation, pp. 49(3)., Feb. 1992.
"Automated customer support: automated help desk system for Compaq," EDGE: Work–Group Computing Report, p. 39., Mar. 1992.
O. Fischer, et al., "Extending the Indexing Vocabulary of Case Based Reasoning with Task Specific Features," Proc.: Eighth Conf. Artificial Intelligence for Application, pp. 226–232., Mar. 1992.

(List continued on next page.)

*Primary Examiner*—Robert W. Downs
*Attorney, Agent, or Firm*—Pennie & Edmonds LLP

[57] ABSTRACT

An adaptive learning system in which knowledge is represented in the form of discrete concepts that are associated with one another. Each such association of concepts is called a case. In accordance with the invention, the degree of association of the concepts in the various cases can be specified by a mathematical score. As a result, if one concept such as the description of a problem is specified to this system, the system will identify associated concepts such as the likely solutions of the problem in the order of likelihood. The adaptive learning system is initialized by loading into the system cases which typically were derived from previous experience. The cases are stored by the is processor in a case table in long-term memory. Each of the concepts identified in the cases is stored in the concept table in the long-term memory. From these cases the processor can then generate in real time ordered lists of concepts which are most closely associated with free text or with one or more concepts that are provided as inputs to the system.

61 Claims, 18 Drawing Sheets

OTHER PUBLICATIONS

Product Showcase, "Hop on the CBR Express," AI Expert, p. 55., Jul. 1992.

B. Grimes, "Help yourself to tech support," PC Magazine, p. 34., Sep. 1992.

M. ferranti, "Help-desk package taps neutral-nets," PC Week, pp. 33(2)., Oct. 1993.

Product Announcement, "Boggles the Mind," AI Expert, p. 44., Dec. 1993.

J. Kolodner, Case-Based Reasoning, Morgan Kaufman Pub., Inc., pp. 353-367., Dec. 1993.

J. Koehler, "An Application of Terminological Logics to Case-based Reasoning," Proc.: Principles of Knowledge Representation and Reasoning, pp. 351-362., May 1994.

TOP OF MIND

| NAME | TYPE | CYCLES | CONCEPT | TEXT | SYNONYM |
|---|---|---|---|---|---|
| LASER PRINTER | COMPONENT | 2 | 3 | 1 | 0 |
| DOT MATRIX | COMPONENT | 1 | 1 | 0 | 1 |
| LIGHT PRINT | PROBLEM | 2 | 3 | 2 | 0 |
| DOCUMENT NOT PRINTING | PROBLEM | 1 | 1 | 1 | 0 |
| LOW TONER CARTRIDGE | DIAGNOSIS | 2 | 2 | 0 | 0 |
| WORN RIBBON | DIAGNOSIS | 1 | 1 | 0 | 0 |
| CABLE DISCONNECTED | DIAGNOSIS | 1 | 1 | 0 | 0 |

FIG.12

TOP OF MIND HELP DESK

| FILE | VIEW | SEARCH | MAINTENANCE | REPORTS | | | | | |
|------|------|--------|-------------|---------|---|---|---|---|---|
| SAVE | BROWSER | QBE | PRINT | MESSAGE | BULLETIN | ACTIVITY | INVENTORY | TRAINING | FREEFORM |
| ADD | | | | | | | | | EXIT |

12 39 21

CURRENTLY TOP OF MIND...

| | | STRNG | CS | CONC | TEXT | SYN |
|---|---|---|---|---|---|---|
| C | WINDOWS SETUP STOPS (DOS TO WINDOWS) | PROBLEM | 38 | 0 | 0 | 8 | 4 |
| C | WINDOWS WON'T START | PROBLEM | 38 | 0 | 0 | 8 | 4 |
| C | WINDOWS SETUP CAN'T DETECT HW CORRECT | DIAGNOSIS | 23 | 0 | 0 | 8 | 0 |
| P | SOFTWARE CANNOT RUN | PROBLEM | 21 | 0 | 0 | 0 | 4 |
| C | CANNOT EXIT SUBSYSTEM | PROBLEM | 21 | 0 | 0 | 0 | 4 |
| P | REBOOT SYSTEM | ACTION | 21 | 0 | 0 | 0 | 4 |
| P | CANNOT INSTALL | PROBLEM | 21 | 0 | 0 | 0 | 4 |
| D | CHECK DOCUMENTATION | ACTION | 15 | 0 | 0 | 4 | 4 |
| A | CANNOT UPDATE FILE | PROBLEM | 15 | 0 | 0 | 4 | 0 |
| | USER SIGNON | COMPONENT | 15 | 0 | 0 | 4 | 0 |
| R | USER ID REJECTED | PROBLEM | 15 | 0 | 0 | 4 | 0 |
| P | LOG USER OFF | ACTION | 15 | 0 | 0 | 4 | 0 |
| | WORDPERFECT FOR WINDOWS | COMPONENT | 15 | 0 | 0 | 4 | 0 |
| | AFTER DARK FOR WINDOWS | COMPONENT | 15 | 0 | 0 | 4 | 0 |
| | RESTART PROGRAM | ACTION | 15 | 0 | 0 | 4 | 0 |
| | WINDOWS CONTROL PANEL | COMPONENT | 15 | 0 | 0 | 4 | 0 |
| | WINDOWS TERMINAL | COMPONENT | 15 | 0 | 0 | 4 | 0 |
| | MICROSOFT WORD FOR WINDOWS | COMPONENT | 15 | 0 | 0 | 4 | 0 |

GLOBAL SEQUENCE=5  
CONCEPT DIMENSION=0

▨ -CASE ACTIVATION ▨ -TEXT SEARCH ACTIVATION  
▨ -CONCEPT ACTIVATION ▨ -SYNONYM ACTIVATION

SYSTEM AND METHOD FOR REPRESENTING AND RETRIEVING KNOWLEDGE IN AN ADAPTIVE COGNITIVE NETWORK

This is a continuation, of application Ser. No. 08/263,644 filed Jun. 22, 1994 now abandoned.

FIELD OF THE INVENTION

The present invention relates to an artificial intelligence method and apparatus for representing knowledge in computer software. The invention is designed to support users in analyzing situations, retrieving relevant information from documentation, making decisions, formulating policies and procedures, and developing complex documents.

BACKGROUND OF THE INVENTION

The term artificial intelligence (A.I.) embraces an array of software techniques developed over the past 30 years and applied, with varying degrees of success, to solving problems and assisting users in decision-making.

Many A.I. applications are so-called "expert systems" composed of branching IF-THEN statements or rules arranged in complex logic trees. The rules generally are constructed by "knowledge engineers," programmers skilled in A.I. logic, working with experts in the selected knowledge domain, either by deliberate, painstaking rule-by-rule construction, or by semi-automated means such as induction from tables. Effective expert systems have been developed in domains such as industrial process control, relatively straightforward and static environments in which full advantage can be taken of human experts who have command of essentially all required knowledge. Fundamental assumptions of such systems are that users can construct a stable logic tree with enough rules to cover all aspects of the environment; that the problems and resolutions relevant in the environment can be modeled as a set of logical rules; and that the logic will keep its integrity as the environment changes.

In practice, expert systems have generally failed in complex and unpredictable applications in which it is impossible for anyone to hold all relevant knowledge and keep up with constant changes in the environment. Highly skilled programmers would be required to write and maintain a decision tree of tens of thousands, or hundreds of thousands, of rules to provide useful help. Most organizations do not have the resources to pursue this goal, which may be impossible in many domains anyway. A further limitation is that complex logic trees are difficult to change once they have been constructed. Thus, rule-based expert systems rapidly become outdated.

Further details on expert systems may be found in the entry on "Expert Systems" by Edward A. Feigenbaum in *Encyclopedia of Computer Science*, 3d Ed., pp. 536–540 (Van Nostrand Reinhold 1993), which is incorporated herein by reference.

An alternative to logically programmed expert systems is "case-based reasoning." This term is applied to systems that derive the data to help diagnose problems from similar past cases, rather than logic trees. While case-based reasoning systems obviate the rigid, rule-bound programming of expert systems, they have had their own constraints. Case-based reasoning systems generally rely on "query by example" techniques, in which a sample or test case is entered into the system, which then searches a database of past cases to retrieve a set of similar or identical examples. The similar past cases, it is assumed, will contain information useful in solving the current problem. Alternatively, or in addition, a case-based reasoning system may retrieve past cases based on the user's text description of the current situation. This type of system uses an A.I. technique called text parsing, searching past cases for words and phrases similar to those used in the current case. Either way, the user first retrieves ostensibly useful past cases and then applies some logical reasoning technique to derive valuable inferences from this finite set. Key assumptions in the case-based reasoning approach are that users will describe analogous situations in consistent ways, adhering to a reasonably uniform nomenclature, and that the implementation is such that the system will continue to search rapidly enough to be practical as the case base grows in size.

While case-based reasoning has succeeded in certain applications, there are at least two problems with this approach: Both query by example and text parsing consume large amounts of processor resources and produce significant volumes of data traffic across multi-user networks. Case-based reasoning systems tend to be unacceptably slow if more than several hundred cases are included in the system. Also, the logical analysis performed to derive value from the past cases usually is based on rules. As with expert systems, these rules have to be meticulously maintained, at great expense.

Another technology that is conceptually related to case-based reasoning is the neural network. "Neural nets" are systems designed to mimic biological learning from experience. That is, they derive a measure of "associatedness" between ideas or things, based on examples. The examples are cases that have a common data format. The system is not programmed, as with a logic tree; rather, it continuously compares all cases simultaneously, noting what things are associated with one another and how strongly they are associated. A neural net is composed of processing elements called neurons, which represent features or entities, all of which are connected to one another. The connections represent associations between data elements. Strong associations are represented by high-valued mathematical weightings, weak associations by low-valued weightings.

This is closely analogous to the way the human mind works. When we learn, experience causes us to associate some things strongly, some weakly, some not at all. These associations not only guide us through life but are the bases for most problem solving. We also learn logical rules that are useful in solving certain kinds of problems. However, the logic required to deal with increasingly complex problems in multi-featured environments grows geometrically. Cognitive psychology shows that we depend on association, rather than logic, in most of our daily decision-making. Expertise in a particular area of knowledge is far more a matter of experience and association than it is a process of learning logical rules.

Neural networks have been highly successful in pattern recognition applications such as machine vision and handwriting analysis, in which the cases consist of complex input from electronic sensors. They also have been useful in finding meaningful patterns in extremely noisy samples of data, as in tracking the demand cycles in stock or commodities markets. In addition, neural nets can find patterns of association in domains that previously have been modeled using rule-based expert systems, and can infer associations that function, in effect, as rules for problem-solving.

Unfortunately, neural networks share at least two limitations with expert systems in this type of application. First, while new cases are easily added to a neural network, the system must then "study" its entire case base to absorb the implications of the new information, resetting the mathematical weightings of the associations between data elements. Considerable research has gone into novel means to speed up the learning cycle of neural nets, but these systems must in any case be taken off line each time they relearn, and the process can still take hours in larger networks. This makes neural networks impractical for modeling constantly changing domains in which users must analyze situations and resolve problems based on the most current information.

In addition, neural nets do not scale up easily into practical large-scale systems. The system requires storage not only of the data elements and the cases, but also the mathematical weightings between data elements. These additional data consume large volumes of storage space, and accessing the weights consumes considerable computer processor capacity.

Further details on neural networks may be found in the entry on "Neural Networks" by Andrew Lane in *Encyclopedia of Computer Science*, 3d Ed., pp. 929-934, which is incorporated herein by reference.

There is a significant need for a system, operating in a multi-user computer network, that enables users to capture their collective experience in dealing with real, multi-faceted situations, without having to learn to program expert system logic or spend time maintaining a complex rule base. In order to be practical, such a system must be self-organizing, borrowing from neural network technology the capacity to organize knowledge in a fashion analogous to biological cognition but without requiring continual relearning. It must operate rapidly and efficiently in conventional computer hardware, and must operate efficiently on either a small or large scale. The present invention relates to such a system, and to specific application programs incorporating this system.

SUMMARY OF THE INVENTION

The present invention relates to an adaptive learning system in which knowledge is represented in the form of discrete concepts that are associated with one another. Each such association of concepts is called a case or an experience unit. The discrete concepts are the basic ideas with which the system is concerned. They are not raw input but are generalizations or abstractions which encompass many different versions of raw input under one concept. Examples of concepts are ideas, people, things, actions, events. The use of concepts instead of raw input allows the use of a manageable number of terms to describe the information in the adaptive learning system and simplifies the management of the associations among the information in the system.

In accordance with the invention, the degree of association of the concepts in the various cases can be specified by a mathematical score. As a result, if one concept such as the description of a problem is specified to this system, the system will identify associated concepts such as the likely solutions of the problem in the order of likelihood. Moreover, user interactions with the system change the mathematical scores of these associations, causing changes in the order in which associated concepts are identified. The system, in effect, learns from the user's interactions with the system.

The adaptive learning system includes a computer processor and a random access memory which is organized into a short-term memory and a long-term memory. Advantageously, additional memory is provided by a file server. The processor provides the control for the system, the means to associate concepts with one another by calculating mathematical scores, and the means to update the memory. The short-term memory stores lists of concepts which are ordered by their degree of association to specific matters of immediate interest to the user. The long-term memory stores a table of concepts and a table of cases. Approximately 2 to 3 MegaBytes of random access memory are typically needed for storage of the concept and case tables and the short-term memory. A conventional user interface provides a means for one or more users to provide information to the system and retrieve information therefrom. Illustratively, the interface is a Windows-based graphical user interface (GUI) including a keyboard, a mouse and a display.

The adaptive learning system is initialized by loading into the system cases which typically were derived from previous experience. For example, if the system application is as a help desk that is used in maintaining a computer network, each of the cases that is initially input into the system might identify a user, the equipment he is using, a problem previously encountered with the equipment, a diagnosis of the cause of the problem and a recommended action that was taken to solve the problem. The cases are stored by the processor in the case table in long-term memory. Each of the concepts identified in the cases is stored in the concept table in the long-term memory. As is detailed below, the case and concept tables are stored in compact form so as to minimize storage requirements and expedite searching of these tables.

From these cases the processor can then generate in real time ordered lists of concepts which are most closely associated with free text or with one or more concepts that are provided as inputs to the system. For example, if the system is queried about a specific problem experienced by a specific user with specific equipment, it can generate a list of possible diagnoses and corrective actions of this problem with the diagnoses and corrective actions ordered in the sequence of most likely diagnosis or correction on the basis of a past experience. Moreover, the system accumulates the information received about each new problem, which constitutes a new case, by constantly updating its case table in the long-term memory. As a result, each time the lists in short-term memory are regenerated, they too have been updated so that the order of diagnoses and corrective actions on the list will change with accumulated experience.

The system provides a type of processing that is conceptually close to that of a neural network, but overcomes the drawbacks of conventional neural nets, i.e., their need for continual retraining and their inability to scale up to large size, which arise because the neural net program and data are too large to reside in RAM. The system is more compact in part because the system does not require permanent storage of values for connection weights between concepts, as does a neural network. Rather, the system of the present invention simply stores the raw data in the form of concepts and cases in the long-term memory and computes in real time the scores needed to order the concepts for presentation to the user in the form of appropriate lists.

This real time computation is made possible by the use of a novel method for evaluating the degree of association between free text or a set of one or more concepts that is presented to the adaptive learning system and the cases that are stored in the long-term memory. In accordance with this method the free text or concepts that are presented in a query to the adaptive learning system are compared against the concepts in each case stored in long-term memory. For each case in which a match is found, all the concepts in that case are "activated." A record is kept of the number of times each concept is so activated. This process is repeated for each element in the query that is presented and the number of activations of each concept is accumulated. In addition, for each concept that is activated, a record is kept of the number of queries for which each concept is activated. These two numbers are then weighted in accordance with a weighting algorithm and the weighted values are combined to generate a score which determines the order in which the concepts are presented in an output list stored in short-term memory.

BRIEF DESCRIPTION OF THE DRAWINGS

These and other objects, features and elements of the invention will be more readily apparent from the following detailed description of the invention in which:

FIGS. 3–7 are illustrations of computer screens used in an illustrative embodiment of the invention;

FIG. 12 is a depiction of illustrative contents of a short-term memory in accordance with the invention;

FIGS. 15 and 16 illustrate a first feature of the preferred embodiment of the invention; and FIGS. 17 and 18 illustrate a second feature of the preferred embodiment of the invention.

DETAILED DESCRIPTION

Figure 1:
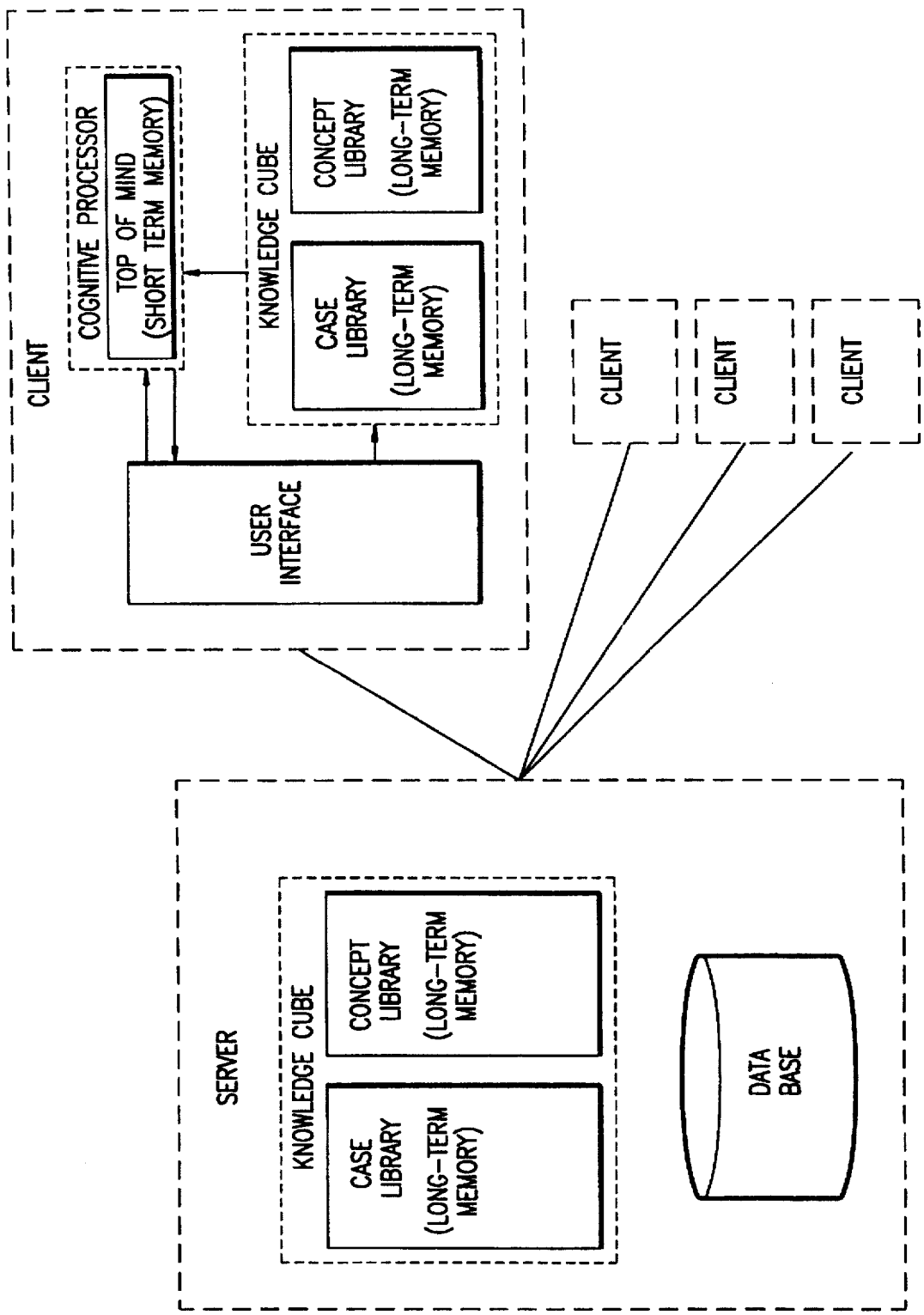
FIG. 1 is a schematic illustration of a preferred embodiment of a system in which the invention is implemented.

FIG. 1 is a schematic illustration of a preferred embodiment of a system in which the present invention is implemented. As shown, the system comprises a plurality of terminals 1 that are connected by suitable means such as a network to a file server 2. Each terminal includes a processor 3, a user interface 4 and a random access memory 5. The practice of the invention is not limited to a particular type of processor or interface. Illustratively, the terminals feature 486 or Pentium processors or their equivalents and Windows-based user interfaces with a keyboard, mouse and color display. The terminals and user interface are commercially available products and form no part of the invention.

In accordance with the invention, the random access memory is partitioned in various parts including program storage, a long-term memory referred to as a knowledge cube 6 and a short-term memory referred to as Top Of Mind 7. The file server includes data base storage 8 and an archival copy of the knowledge cube 9. Advantageously, knowledge cube 9 is periodically updated with new information from each of the knowledge cubes 6 of the terminals; and individual knowledge cubes 6 in the terminal memories are loaded periodically from knowledge cube 9 of the file server.

Each knowledge cube includes a case table, a concept table and advantageously a lookup table. Concepts are the basic units of thought that are manipulated by the system. As indicated above, concepts are not raw input but are generalizations or abstractions that encompass many different versions of raw input. They may identify people, objects, operating conditions, actions to be taken and the like. Cases are associations of related concepts.

The case and concept tables are designed so that they can store their information very compactly both to minimize storage requirements and to expedite the searching of this information. In the concept table, each concept is stored in the form of a two byte identifier number, a concept name, a concept type, and a list of synonyms for the concept name. The concept name is a character string, illustratively 20 bytes long; the synonyms are character strings, which illustratively average 20 bytes per concept; and the type is a classifier which illustratively is one byte. In the case table, each case is stored in the form of a two byte identifier number and a string of two byte units, each unit being the identifier number of one of the associated concepts. In addition, the long-term memory advantageously includes a lookup table which identifies for each concept the identifiers of all the cases in which that concept is found.

Typically, each case will encompass seven to ten concepts. Thus, a case table of up to 65,536 cases can be stored in less than 1.5 megabytes of memory. Similarly, the two byte identifier number of each concept allows for 65,536 different concepts; and a concept table of up to 65,536 concepts can be stored in about 3.0 megabytes of memory. The size of the lookup table will vary with the application but it can be expected to be comparable in size to the concept table.

The foregoing numbers provide estimates of maximum memory requirements for the case and concept tables. In practice, the number of cases and the number of concepts in the typical application are far less.

In addition to the case and concept tables, information about the concepts may also be stored in the data base memory in the file server. This memory may include, for example, free text description associated with the concept.

One implementation of the present invention is in the form of a help desk and the operation of the invention from the user's standpoint will be described in that context in conjunction with FIGS. 2–7. This help desk implementation is commercially available in the TOP OF MIND® software available from The Molloy Group, 90 East Halsey Road, Suite 115, Parsippany, N.J. 07054 (201–884–2040). The Top Of Mind® software is incorporated herein by reference.

Figure 2:
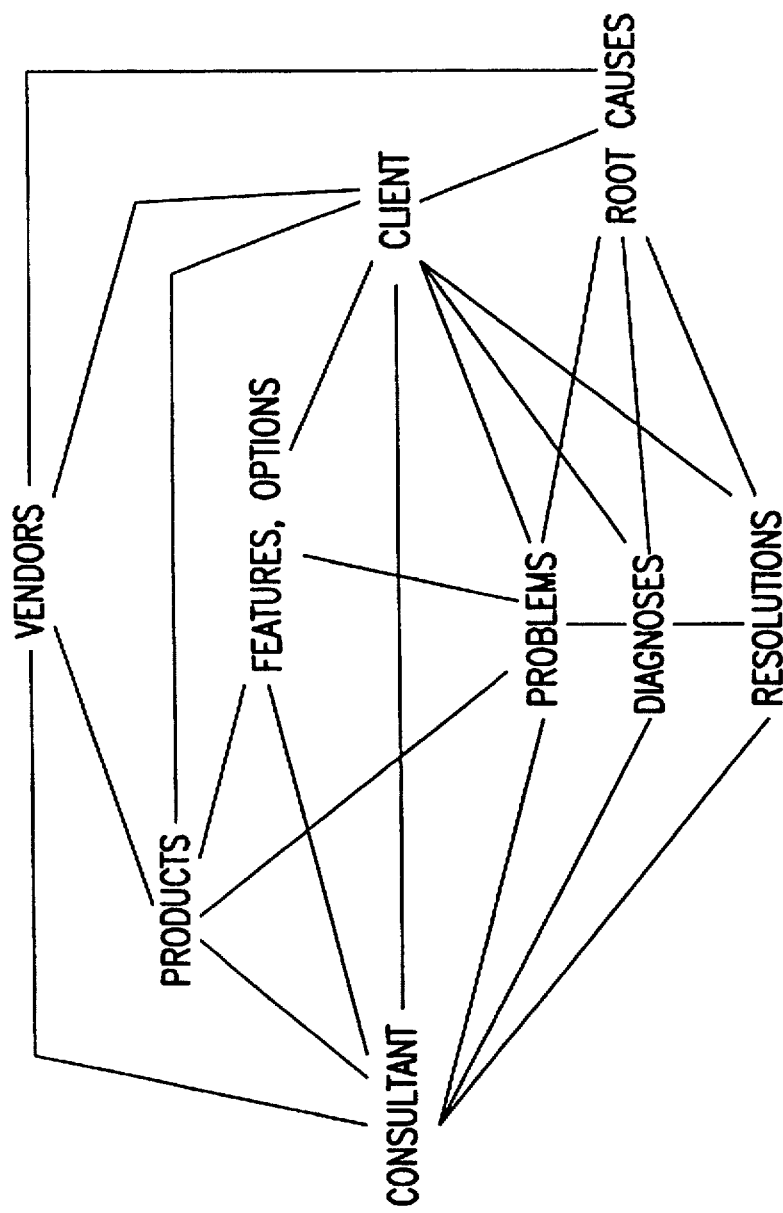
FIG. 2 depicts the relationships that might exist among the concepts found in an illustrative application of the invention.
Figure 7:
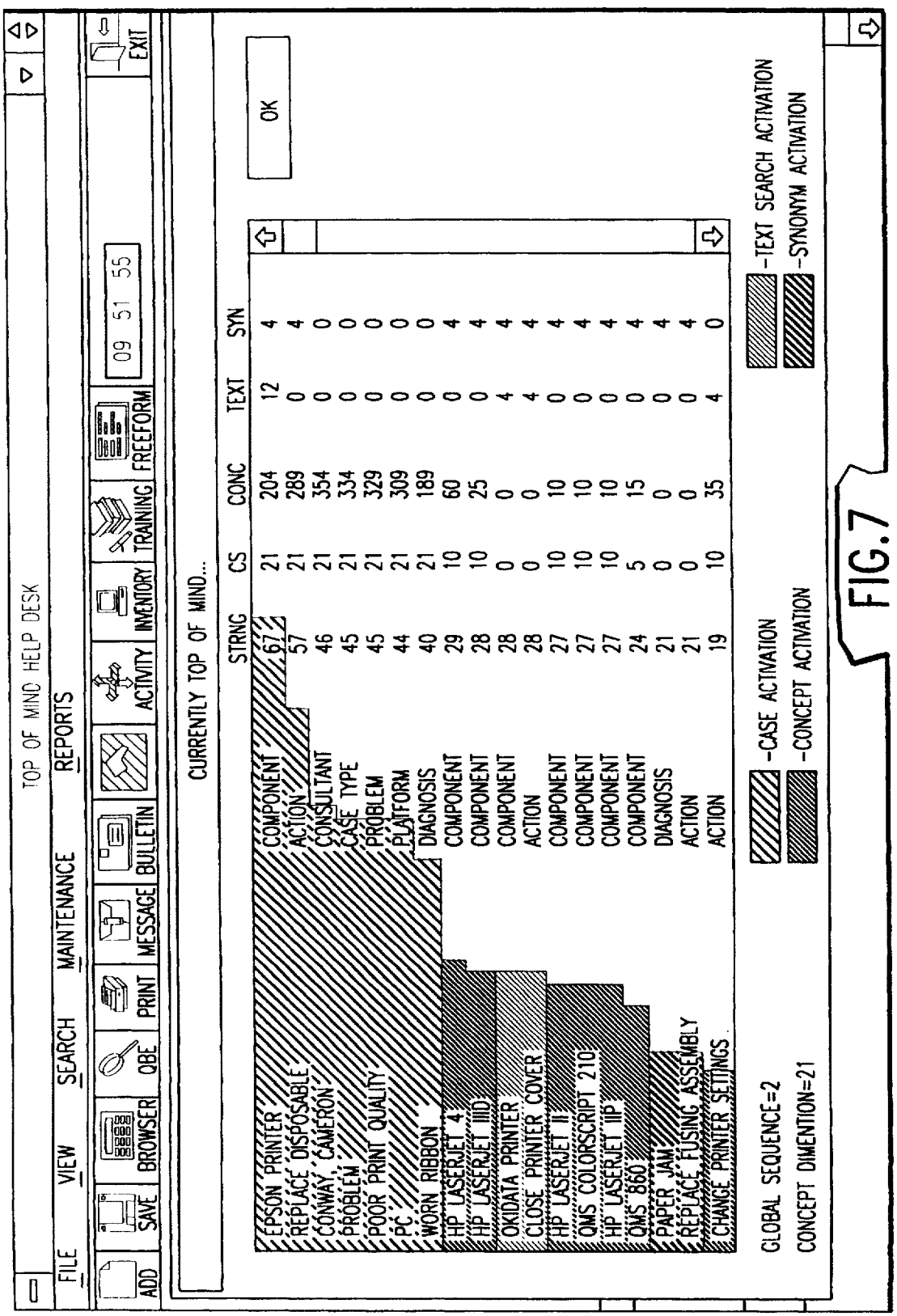

A help desk is used by a help desk consultant to deal with problems that are encountered by users (or clients) in using specific products, the diagnosis for the problem and the resolution (or action) taken to solve the problem. The root causes of the problems, the vendors of the products, and features and options of the product are also important considerations. FIG. 2 illustrates the interrelationships that are typically encountered among the various types of information found in a help desk environment. Extensions of the help desk design to management supervision functions, to sales management, to medical diagnoses and a myriad of other applications will be evident.

FIGS. 3–7 illustrate various states of the case window for the TOP OF MIND® software. As will be apparent, the case window is a WINDOWS® screen having a title bar 10, a first menu bar 20, a tool bar 30, a data entry field 40, a first text entry field 70, a second menu bar 80, and a second text entry field 90. The data entry field 40 contains a set of labeled field identifiers 45 associated with specific data entry fields 50 and select keys 65. The field identifiers identify the following fields:

ID - A unique number that is assigned to a case by the system when a case is saved.

Client - The client (typically a user) initiating contact with the Help Desk.

Case Type - The type of case, usually a problem or request.

Platform - The computer system used by the client, such as a PC, IBM Mainframe or Macintosh.

Component - The client's hardware or software, such as HP LaserJet 4 or Lotus 1-2-3.

Problem - The client's symptoms (or requests), such as "keyboard frozen" or "wants monitor upgrade."

Diagnosis - The reason for a problem, such as "memory upgrade needed" or "incorrect margins set."

Action - A brief description of the action taken to resolve a case, such as "provided temporary password" or "rebooted PC."

Root Cause - The fundamental cause; the larger issue behind the current problem, such as "client inexperience" or "component incompatibility."

Placed By - An additional client name, if the case was opened on behalf of someone else.

Priority - The rating of a case according to urgency; 1 is the highest priority, 9 the lowest.

Consultant - The name of the person who logs the case, typically the help desk support analyst.

Forward To - The consultant to receive the forwarded case.

Open Date/Time - The date and time the case is opened.

Close Date/Time - The date and time the case is closed.

Status - Identifies a case as either open or closed.

In general, each of the entries in the data entry fields 50 are concepts. Advantageously, each concept has a name, a type, a list of synonyms, and associated text. For the case of the help desk that is the subject of FIGS. 2–7, examples of concepts might include the names of the system users, the computer equipment used by each user, the types of problems that might be encountered when operating the system (e.g., paper jam, keyboard frozen, light print), diagnoses (e.g., paper misfeed, invalid sign on, low toner), and actions to be taken (e.g., clear paper, enter correct password, replace disposable). The type of a concept indicates the function of the concept in the system. For the example of the help desk, types might include client or user, component or equipment, problem, diagnosis, corrective action. In many cases the type is the field identifier for the field in which the concept is entered into the system. synonyms are simply alternative words or phrases that might be used in referring to a concept. Associated text is any sort of text that the user might want to relate to a specific concept. It might include the operating history of specific equipment or detailed notes on a specific repair action to be taken, etc.

FIGS. 3 through 7 illustrate the typical interaction of a help desk consultant with an adaptive learning system designed for this use. Prior to the interaction illustrated in FIGS. 3–7 a substantial collection of concepts and cases related to the equipment being supervised has been stored in the memory of the adaptive learning system. This information was used to form case and concept tables stored in a knowledge cube in the terminal used by the help desk consultant.

Figure 3:
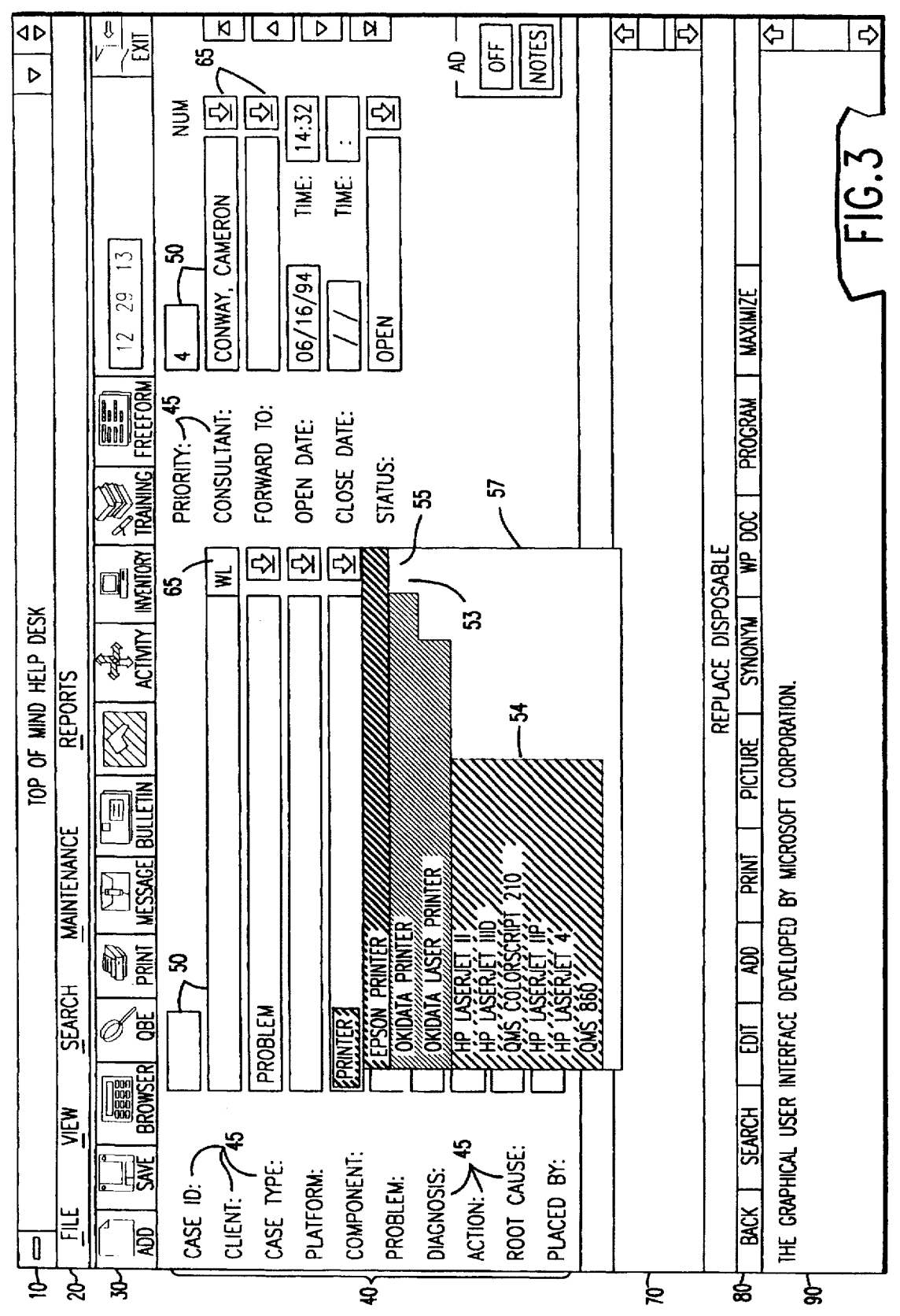

In the example of FIGS. 3–7, the consultant is presented with a user problem involving a printer. As shown in FIG. 3, the consultant first attempts to identify the specific type of printer involved in order to retrieve experience relevant to that printer. The consultant proceeds by typing the word "printer" into the Component field 50, and then pressing the Enter key. The system then attempts to match this input with the information stored in the knowledge cube. This action brings about the activation of a variety of concepts, and these activations are exhibited in the picklist 52, which is displayed just below the Component field. There are several types of activation depending on whether the match occurs with a concept ("concept activation"), with a synonym ("synonym activation"), with a case (case (or cycle) activation), or as a result of text input ("text activation").

The order of the concepts in the picklist is determined by a scoring process. The most strongly activated concepts are brought to the top of the list, and have the longest bars in the graph that is superimposed on the list. Details of the activation and scoring process are as set forth below in the description of FIGS. 8–13.

In FIG. 3, two kinds of activations are shown, text activation and synonym activation, and these are differentiated by the color of the bar behind each phrase in the picklist. The three strongest activations are text activations, and these activations are shown as gray bars 53 at the top of the picklist in FIG. 3. These activations were caused by a match between the text string "printer" entered in the Component field and the text string "print" found in the names of these concepts. Below these are shown six additional concepts which are activated by synonym matches. That is, the string "print" is contained in the synonym list associated with these other concepts. The synonym activations are shown as darker bars 54 at the bottom of the picklist in FIG. 2.

The concept "Epson Printer" is at the top of the picklist. The long bar 55 superimposed on it is not an activation indicator, but is used to select a concept from the list. The bar is moved via an arrow key or a mouse click. The user selects Epson Printer by clicking on it or by positioning this long bar over it and pressing Enter.

Figure 4:
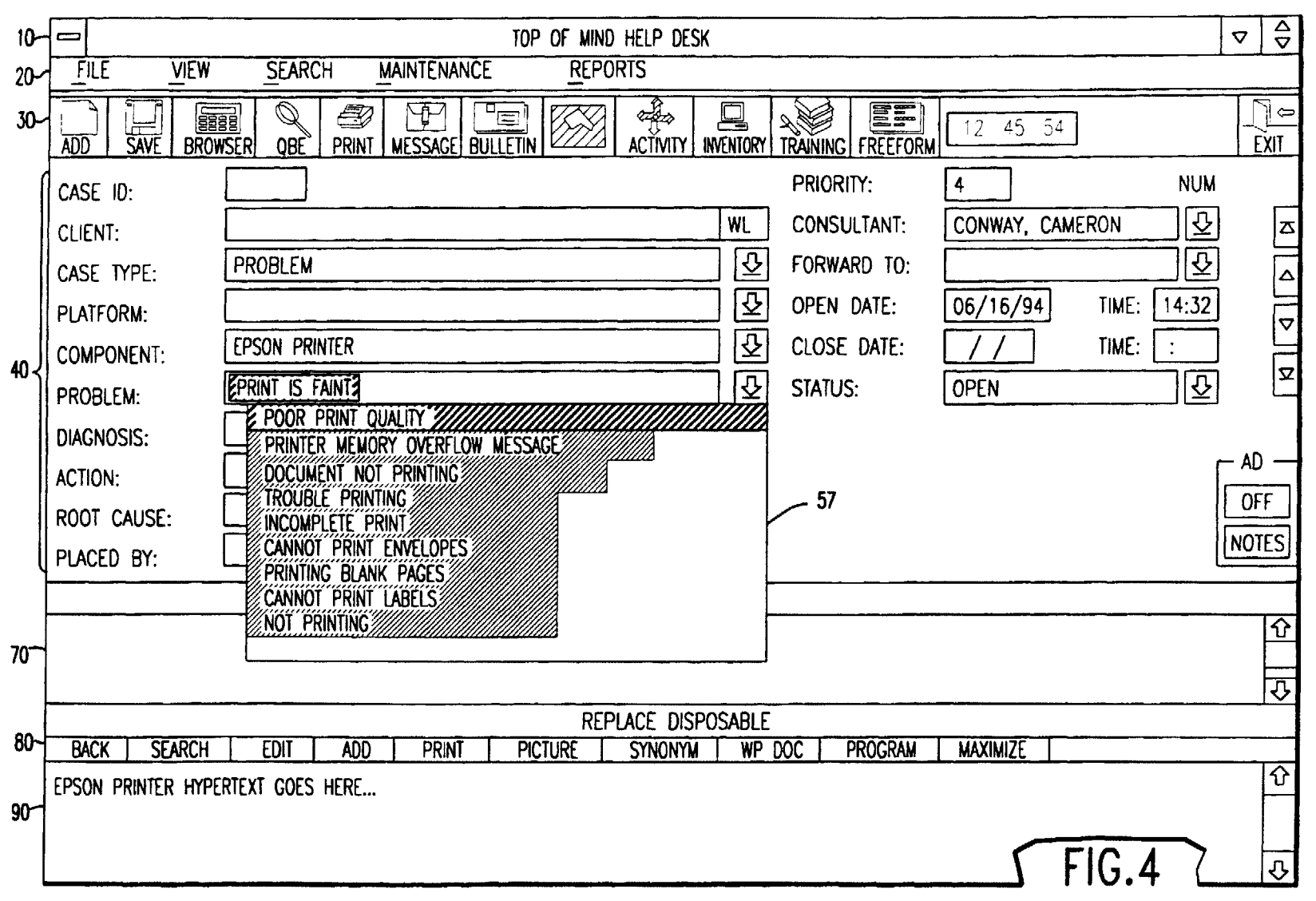

In FIG. 4, Epson Printer has been selected and the consultant has moved on to describe the problem, by typing freeform text into the Problem field 50. In this case, the client reporting the problem describes it by indicating that the "print is faint," and the consultant responds by typing this phrase into the field and pressing Enter. As a result, a variety of concepts describing problems are activated and displayed in picklist 57 immediately below the Problem field. The activations are all shown, by their colored bars, as text activations, because the user entered text in the field. However, the top three choices are more strongly activated because, in addition to the text match, the activation is strengthened by experience. The concept "Poor Print Quality" comes to the top of the list because there are a number of previous instances in the system memory in which this concept is associated with Epson printers.

Figure 5:
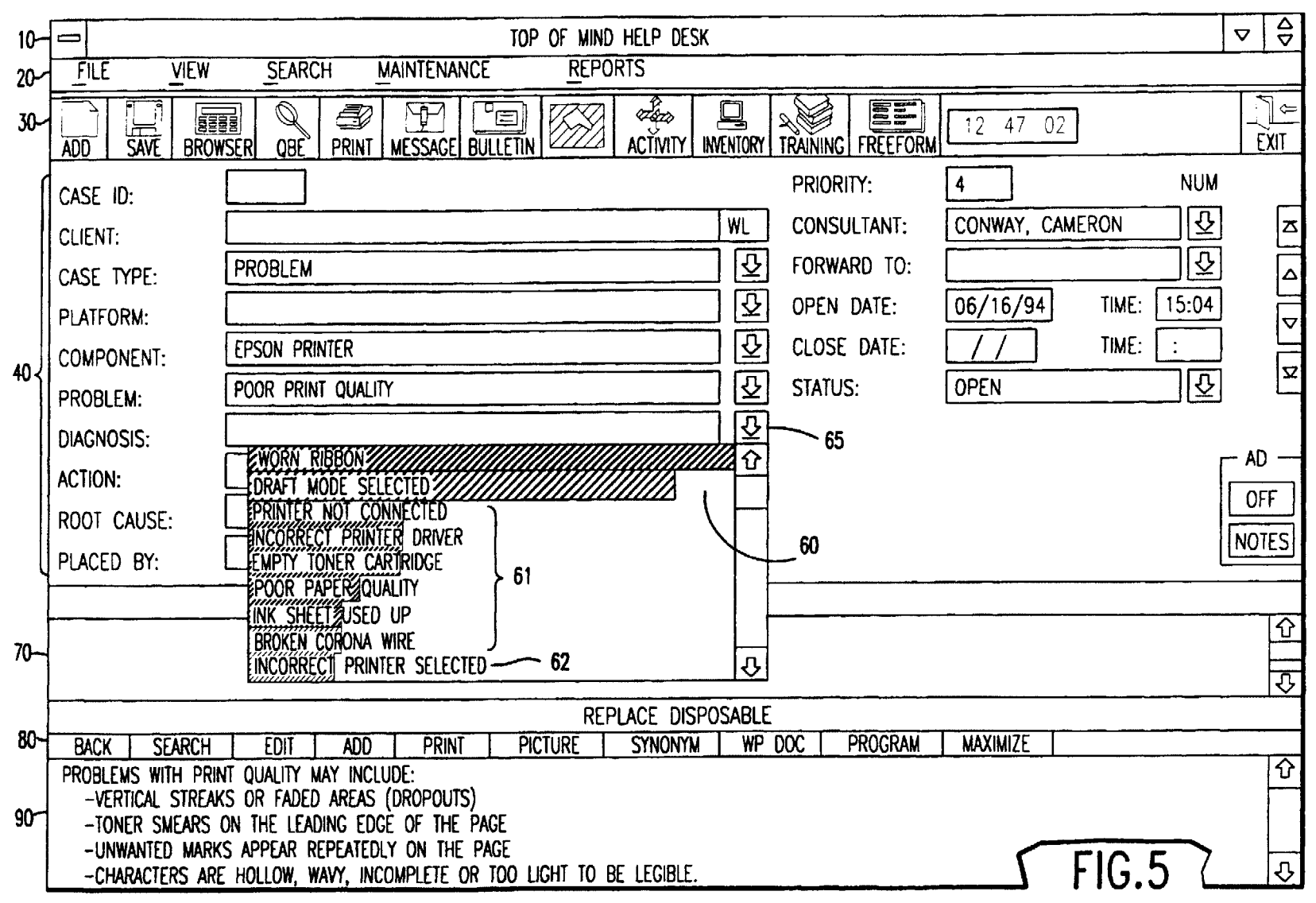

In FIG. 5, the consultant has selected the Problem concept "Poor Print Quality," as a result of a consultation with the user reporting the problem. Typically, during that consultation, the consultant will use the text at the bottom of the screen as a guide. This is hypertext which is associated with the concept Poor Print Quality. Having selected a Problem, the analyst now attempts to find a diagnosis by consulting the system memory via the Diagnosis field 50. The consultant does not enter text, but simply clicks, using the mouse or other pointing device, on the down arrow 65 to the right of the Diagnosis field. This action brings up a new picklist with a complex set of concept activations. The top two concepts are case (or cycle) activations. They are activated because in the system memory there are instances in which Poor Print Quality in Epson printers has been diagnosed as "Worn Ribbon" or "Draft Mode Selected."

Case (or cycle) activations are shown as dark bars 60. Additional concepts are activated somewhat less strongly. These are concept activations, shown as slightly lighter bars 61. Each of these concepts is associated in the system memory either with Epson printers or with poor print quality, but in no instance with both. Thus, while "Empty Toner Cartridge" has a fairly strong association with poor print quality, it is not connected with Epson printers, which use inked ribbons instead of toner. One other concept 62 is activated by a text or synonym match, shown by the lighter-colored bar.

Figure 6:
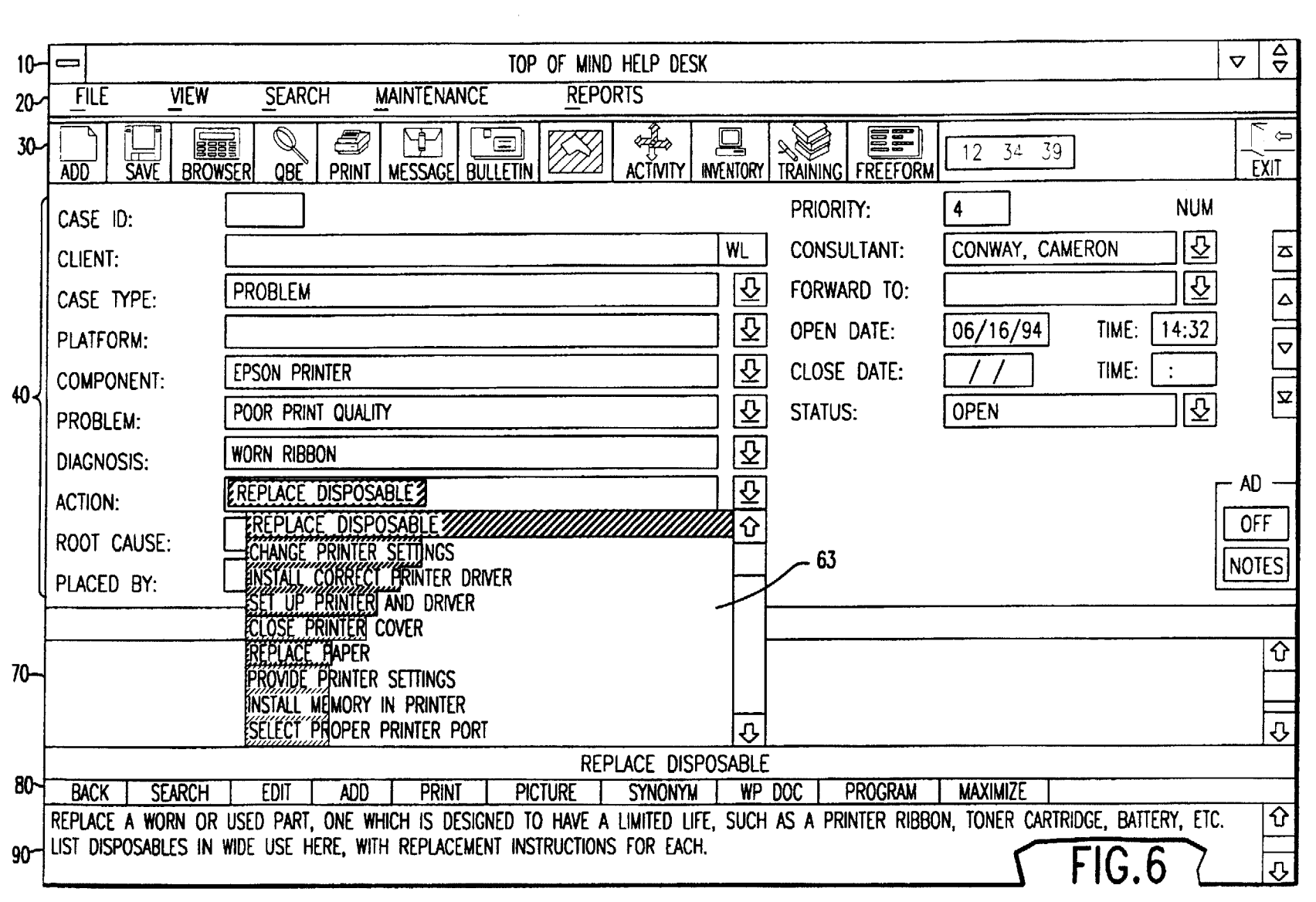

In FIG. 6, the analyst has gone on to seek an appropriate action to resolve the problem, by consulting the knowledge cube through the Action field 50. In the picklist 63 is one case (or cycle) activation, "Replace Disposable," which comes to the top as the best choice. Below this are a series of concept and text activations. The function used to compute the total activation strength in some instances will value a text or synonym activation more highly than a concept activation, as in the example of "Close Printer Cover."

The picklists are generated from information stored by the processor in the Top Of Mind short-term memory. The content of this memory can be examined by a window such as that shown in FIG. 7 which illustrates the activations produced by the steps illustrated in FIGS. 3–6. As in the picklists, the different types of activations are differentiated by different colored bars. Additionally the window shows the case (Cs), Concept (Conc.), text and synonym (syn) activation values used to compute the overall activation strengths for each concept. The overall strength is shown in the column of integers titled "Strng".

Figure 8:
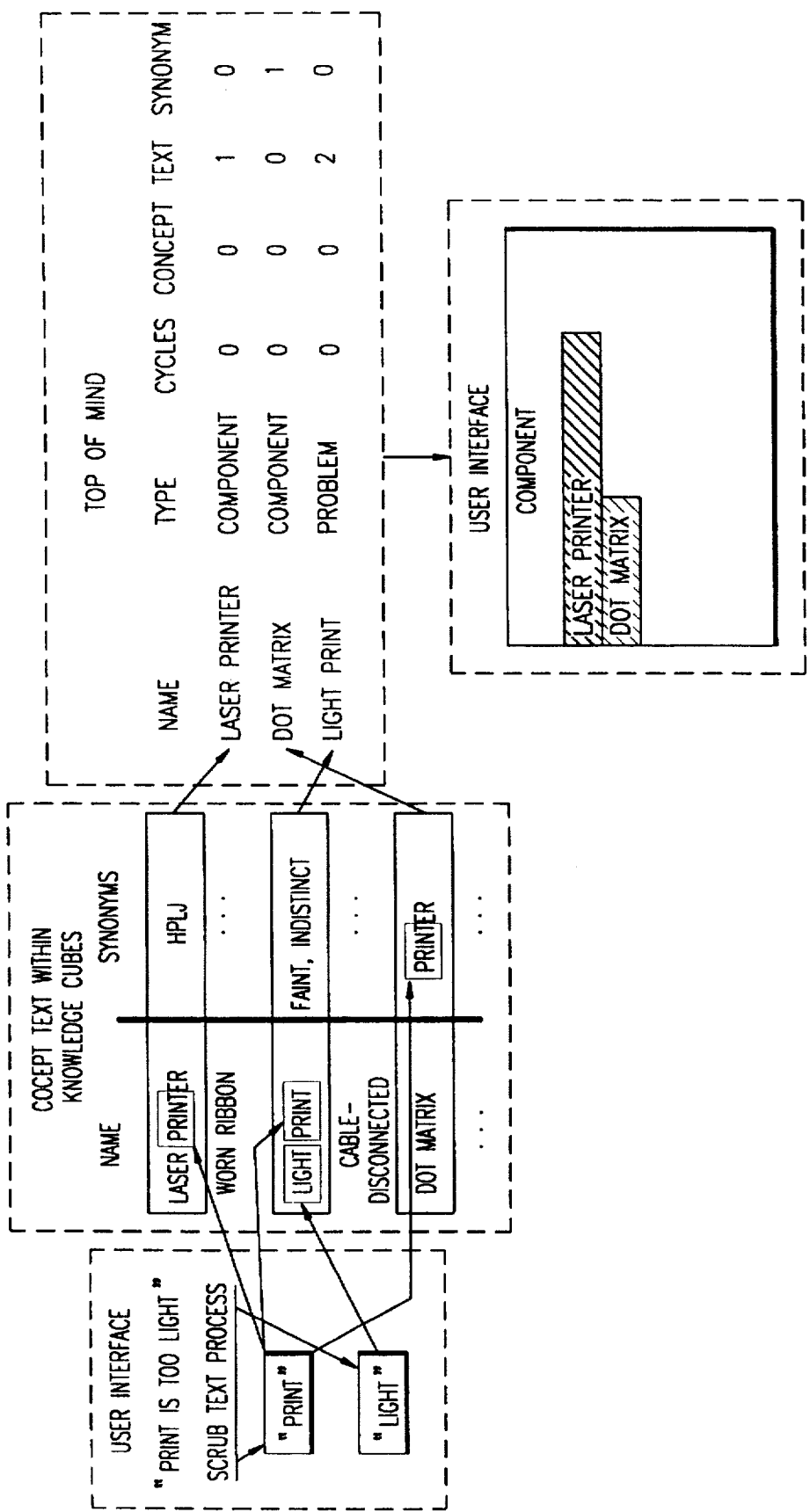
FIGS. 8, 9 and 10 illustrate the activation of Top Of Mind memory.

The operation of the system to produce the picklists of FIGS. 3–6 will be more readily apparent from the following discussion of FIGS. 8–13. FIG. 8 illustrates text activation. Free-form text is entered into the adaptive learning system through the keyboard that is part of the user interface. For example, the user may type a textual phrase, "Print is too light," and introduce it into the system. The indeterminate words "is" and "too" are eliminated from consideration via a text scrub technique. The system then searches the concept table for the words "print" and "light." Each concept has a unique name and some number of associated synonyms. Each concept whose name or table of synonyms contains either string, "print" or "light," is activated. In FIG. 8, "print" is part of the names "Laser Printer" and "Light Print," and occurs in the synonym "printer" for the concept called "Dot Matrix." All three of these concepts are activated. However, the next step in the help desk procedure is to identify the Component involved and only "laser printer" and "dot matrix" have been identified as having the type "Component." The system differentiates text activations, which are based on matches in the concept name, from synonym activations. In this example, the system weights text activations much more than synonym activations and displays "laser printer" with a bar more than twice the length of the bar associated with "dot matrix." The weighting algorithm may be altered to weight text activations equal to or less than synonym activations.

Figure 9:
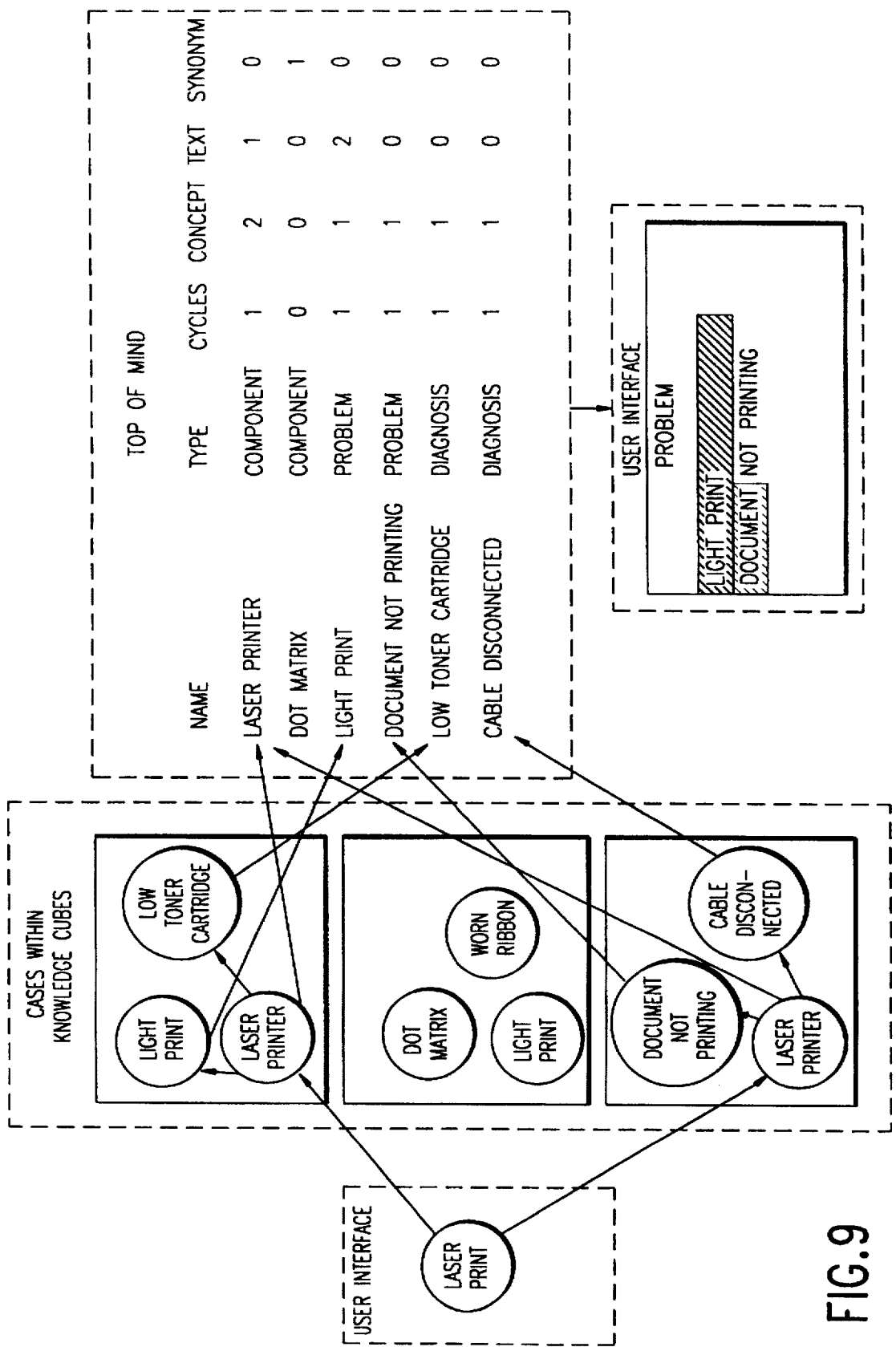
Figure 10:
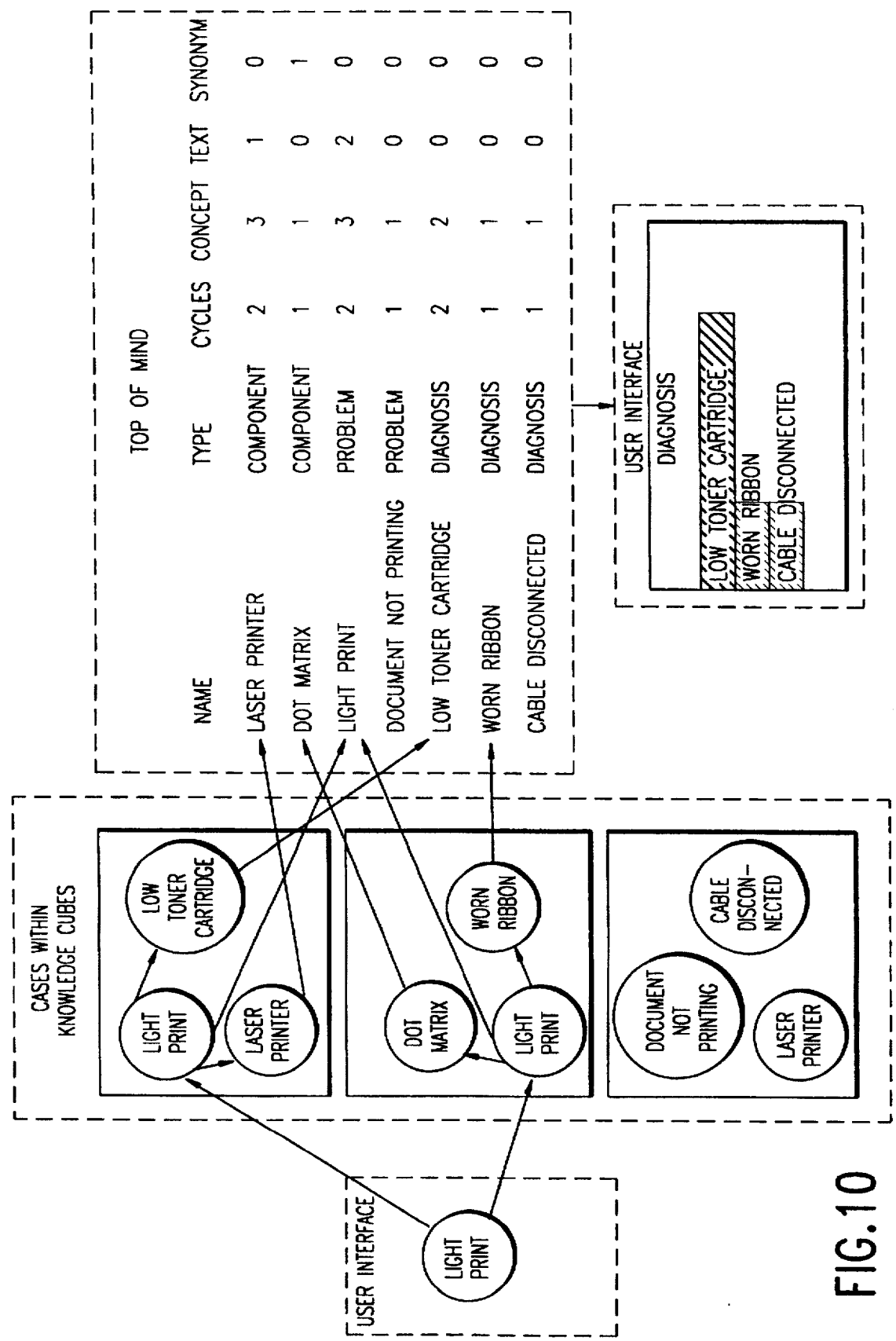

FIGS. 9 and 10 depict the direct activation of concepts in response to the input of multiple cycles of concepts. In the example of FIG. 9, the user has selected the component "Laser Printer" from the list of components presented by the component picklist 110 displayed in FIG. 8. The system searches the knowledge cube for cases in which "Laser Printer" occurs. Advantageously, this is done by the lookup table which identifies for each concept the cases in which that concept is found. It finds two such cases, and increments the concept activations counter in the table at right for "Laser Printer" by two. The system also activates the concepts that occur in the two cases where "Laser Printer" is found. Since each of these additional concepts, "Light Print," "Low Toner Cartridge," "Document Not Printing" and "Cable Disconnected." is found only in one case respectively, each is given one concept activation.

Additionally, each concept that has been activated at least once during this cycle is further given a cycle activation. A concept's cycle activations are incremented in each subsequent cycle where that concept is activated.

A total activation strength is computed and the problem picklist 120 is ordered thereby. Two problems, "Light Print" and "Document Not Printing," are shown with colored bars indicating cycle or concept activation. The user decides that the proper description of the problem at hand is "Light Print" and selects this concept.

FIG. 10 illustrates a second activation cycle following selection of "Light Print." The system searches the knowledge cube and finds "Light Print" in two cases. The system increments the concept activations of "Light Print" by two, for a total of three. It also finds the concepts "Laser Printer," "Low Toner Cartridge," "Dot Matrix" and "Worn Ribbon" in the two cases where "Light Print" occurs, and the concept activations for each of these are incremented by one.

The system also adds a cycle activation to the total for each of the five concepts found. Thus far, there have been two activation cycles. The concepts "Laser Printer," "Light Print" and "Low Toner Cartridge" each have been activated during both cycles, and thus, if the user examines all of the activations in the Top Of Mind memory, these three concepts will appear at the top of the list with colored bars indicating cycle activations. The other concepts activated in this example each have one cycle activation, and thus will appear lower down in the list, with different-colored bars indicating concept activations.

A total activation strength is computed and the diagnosis picklist 130 is ordered thereby. Three diagnoses, "Low Toner Cartridge," "Worn Ribbon" and "Cable Disconnected," are shown with color bars indicating cycle or concept activation.

Figure 11:
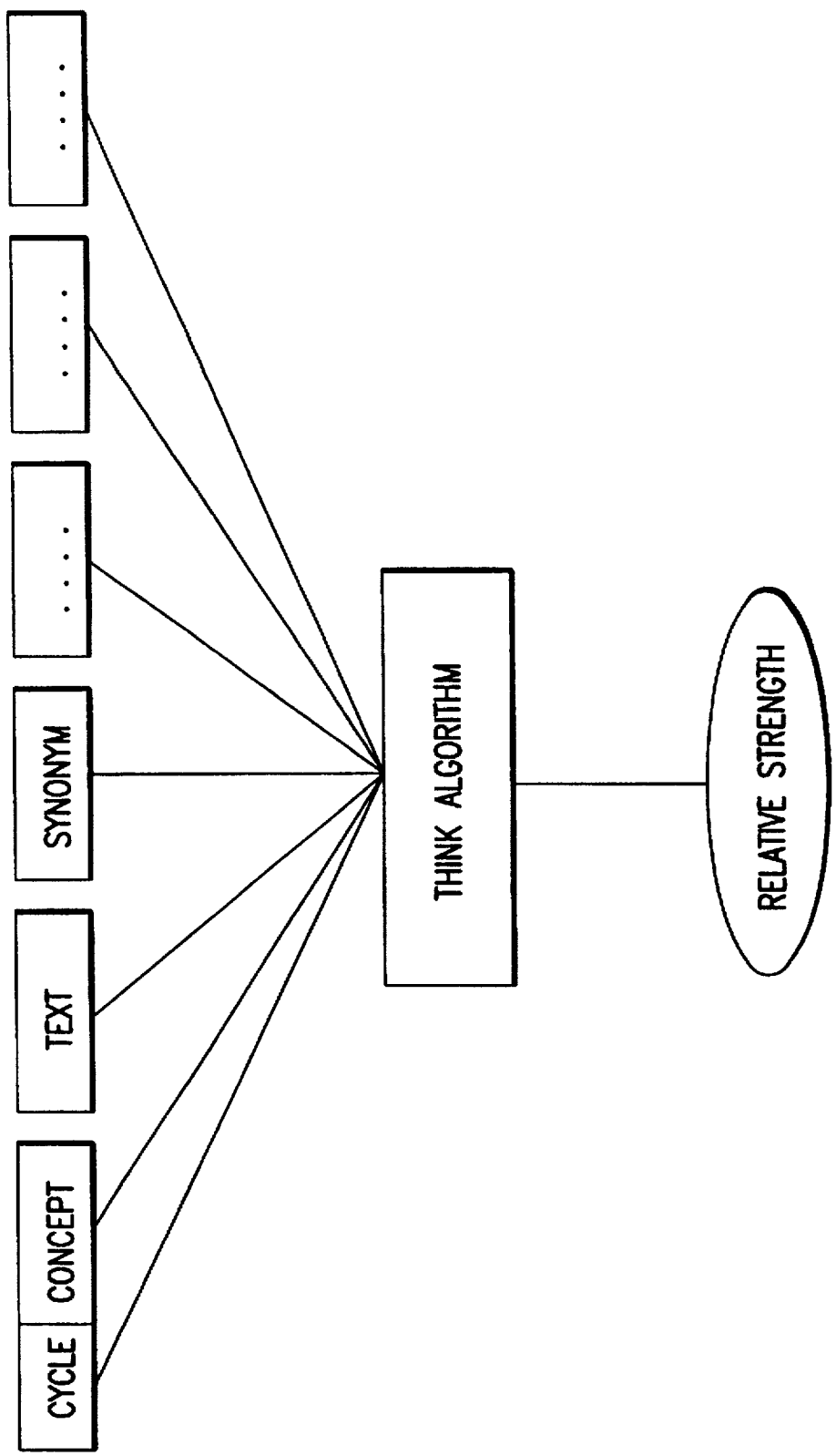
FIG. 11 is a schematic representation of a scoring algorithm used in practicing the invention.

The computation of activation strength is performed by a process called the Think Algorithm. As shown in FIG. 11, this algorithm is applied to all of the activation data for each type of activation. In the present example, these include cycle, concept, text and synonym activations, but FIG. 11 illustrates that other embodiments of this invention may include other types of activations, and the Think Algorithm may differ from one embodiment of the invention to another. The Think Algorithm has the following objectives:

1. To consider input from all possible sources of activation.
2. To generate a list where the best choices are at the top, and choices are ordered in a meaningful way.
3. To have means available (modalities) for dynamically changing weighting parameters during use.

In the help desk application program described above, the Think Algorithm is as follows.

The purpose of the Think Algorithm is to determine a single activation score for each concept in Top Of Mind memory. This score is called the Overall Activation and is computed in the following way:

Overall Activation=Base(type)+(Range(Type)* Related Activations)

Overall Activation ranges from 0 to 100. After this score has been computed for each concept in Top Of Mind memory, the concepts are sorted by score. At this point the user interface may interact with Top Of Mind memory, typically to retrieve ordered subsets of concepts.

Type, Base, Range and Related Activations will be defined in the following discussion.

Activation Type

The activation Type of a concept in Top Of Mind memory is determined by modality tables which provide various weightings for the activation types used for computing Overall Activation scores. Different modality tables are employed to emphasize different kinds of activations. For example, Table 1 below emphasizes "cycle" most, whereas Table 2 emphasizes "text" most. This is indicated by the relative Base values within a given table.

Modality Table 1.

| Activation Type | Base | Range | Weight |
| --- | --- | --- | --- |
| Cycle | 70 | 30 | 1 |
| Concept | 50 | 25 | 2 |
| Text | 30 | 20 | 4 |
| Synonym | 25 | 25 | 2 |

Modality Table 2.

| Activation Type | Base | Range | Weight |
| --- | --- | --- | --- |
| Text | 60 | 40 | 2 |
| Synonym | 50 | 25 | 2 |
| Cycle | 45 | 30 | 5 |
| Concept | 35 | 25 | 4 |

Given a modality table, each concept in Top Of Mind is assigned to a particular activation Type. The Type of a concept is determined by examining each of the Base values for a given modality and selecting the activation Type which has:

1) The greatest Base value, and
2) The Corresponding Top Of Mind activation score is non-zero.

If the highest base value is of activation type "cycle", the activation type "cycle" can be selected only if the activation score of "cycle" is equal to the total number of concepts which have been presented the Knowledge cube.

For example, for the example set forth in Table 3 below where the seven concepts in the left hand column have the activation score set forth and modality Table 2 has been selected, the concepts "Laser Printer", "Light Print" and "Doc Not Printing" are determined to be of activation Type "text", because in modality 2, "text" has the highest Base value "60", and the corresponding text activation score "1", is non-zero.

The second concept "Dot Matrix" is determined to be of Type "synonym", because in modality 2, "synonym" is the activation type which has the highest Base value "50", and a non-zero activation score "1". Although "text" has a higher base score "60", it cannot be considered because its corresponding activation is 0.

The sixth concept, "Worn Ribbon" is determined to be of activation Type "Concept". Even though the other activation types have higher Base values, none of them have non-zero values, or in the case of "cycles" an activation value equal to the number of concepts which have been presented to the knowledge cube. In this example, the number of cycle activations is "1" and the number of activations which have been presented is "2".

TABLE 3

Activations

| Name | Cycle | Concept | Text | Synonym | Activation Type in Mode 2 (emphasis on text) |
| --- | --- | --- | --- | --- | --- |
| Laser Printer | 2 | 3 | 1 | 0 | Text |
| Dot Matrix | 1 | 1 | 0 | 1 | Synonym |
| Light Print | 2 | 3 | 2 | 0 | Text |
| Doc Not Printing | 1 | 1 | 1 | 0 | Text |
| Low Toner Cartridge | 2 | 2 | 0 | 0 | Cycle |
| Worn Ribbon | 1 | 1 | 0 | 0 | Concept |
| Cable Disconnected | 1 | 1 | 0 | 0 | Concept |

The number of concepts which have been presented thus far to the knowledge cube is 2.

Base

The Base value determines the minimum Overall Activation that a concept of a given activation Type can have.

Range

The Base plus the Range determines the maximum Overall Activation that a concept of a given activation Type can have. For example, the activation Type "text" in the second modality table has a Base value of 60, and a Range of 40. Therefore, its Overall Activation can vary between 60 and 100.

Related Activations

Related Activations are computed as:

$$\frac{\Sigma(\text{Activation}(i) * \text{Weight}(i)/\text{MaxActivation}(\text{TYPE}))}{\Sigma \text{Weight}(i)}$$

where i iterates the set of all activations for a given concept. In the previous example there are four different activations: cycles, concept, text and synonym. In similar fashion, weight is determined by the modality table for cycles, concept, text and synonym. Weight determines how important a particular type (e.g., "text") is to the final score.

MaxActivation(TYPE) for each type is defined as the maximum score for a given column or activation type. From the previous example:

MaxActivation("Cycle")=2

MaxActivation("Concept")=3

MaxActivation("Text")=2

MaxActivation("Synonym")=1

From these values of base, range and related activations, the overall activation score for each concept is then computed in accordance with the formula set forth above.

To summarize the foregoing discussion, there are two distinct processes used in the invention:

1) Activating concepts by presenting concepts and/or text to the knowledge cube; incrementing or decrementing the activation scores of the concepts which are in the Top Of Mind area, and copying the concepts into the Top Of Mind area if they are not present. Activations presented to the knowledge cube can be of varying weights and can also have negative weighting coefficients. A negative weight can have the arithmetic effect of counteracting previous activations.

2) Evaluating all concepts which are in the Top Of Mind area according to an algorithm for this purpose. The evaluation results in an overall score being assigned to each concept, followed by a sorting of concepts by score. Evaluation of the scores does not change raw scores; consequently, multiple evaluations can be performed with the same scores but using different 'Think' algorithms and/or parameters.

In accordance with the invention, these processes may be performed independently of one another. For example, step one might be repeated three times, followed by step two being repeated twice. This method of processing is clearly distinct from expert system, case-based reasoning and neural net approaches.

FIG. 12 shows a table of all of the activations for the concepts in the Top Of Mind memory. "Document Not Printing" and "Worn Ribbon" each have one concept activation and one cycle activation. However, "Document Not Printing" will occur higher in the list than "Worn Ribbon," because the former also has a text activation. The system takes this into account when it computes the total activation strength of each concept at the end of each cycle.

Figure 13:
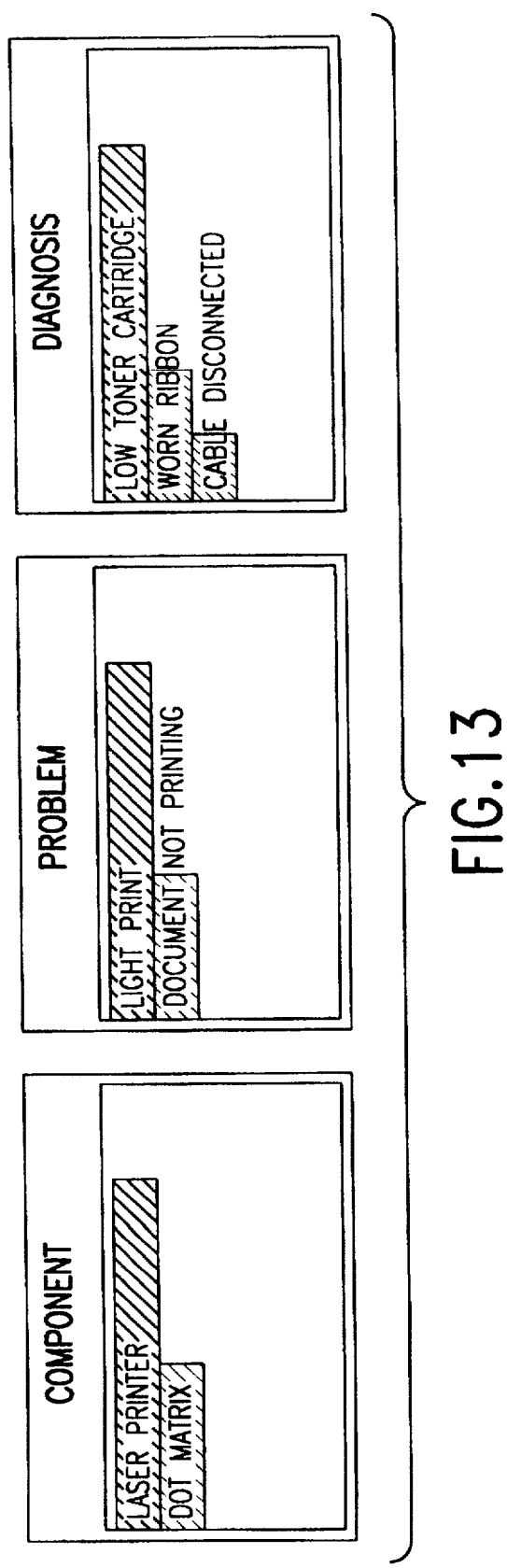
FIG. 13 is a depiction of illustrative picklists that are used in the practice of the invention.

FIG. 13 shows the activation states that may be seen in several different picklists at this point in the session. Each picklist in this example shows only concepts of one given concept type, such as Component, Problem or Diagnosis. A number of additional means of presentation of the activations in short-term memory, other than picklists, are feasible. A different embodiment of the invention could, for example, retrieve and order text associated with the activated concepts to compose a document.

Figure 14:
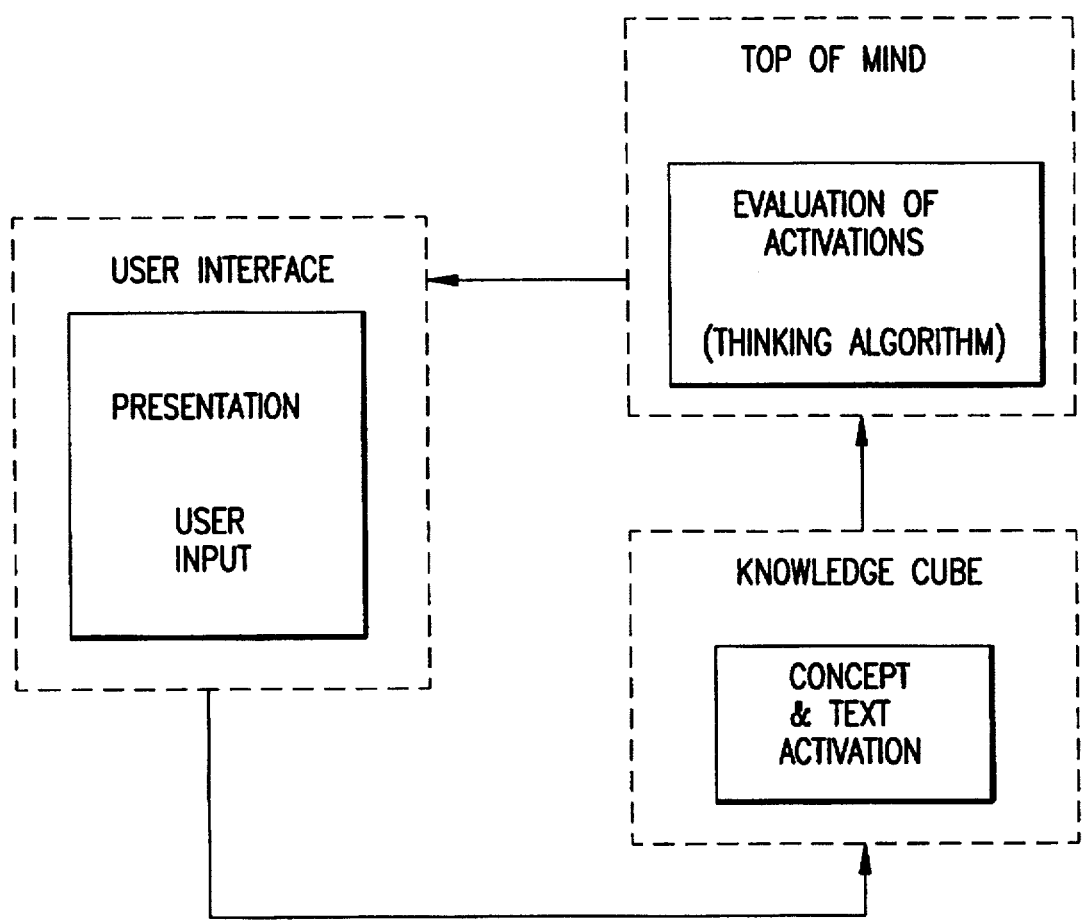
FIG. 14 is a schematic illustration of the work flow in the practice of the invention.

FIG. 14 illustrates the cyclical nature of the user interaction with the adaptive learning system of the present invention. The user provides data to the knowledge cube to bring about concept and text activation. Activated concepts are copied to the Top Of Mind memory, where the activations are evaluated using a Think Algorithm, and the concepts are arranged according to their activation strengths for presentation to the user via the interface, whereupon the user may begin the cycle again. The rapid processing of each cycle, as a result of this invention, makes possible a user dialog between the user and the system, in which the system may propose a continuing sequence of novel inferences and receive immediate feedback. The ability of the present invention to display activations in a fashion that is useful in classifying new data at the point of entry clearly differentiates this invention from expert systems or case based reasoning approaches that rely on static rules or hierarchical, linear searching of case bases.

Figure 15:
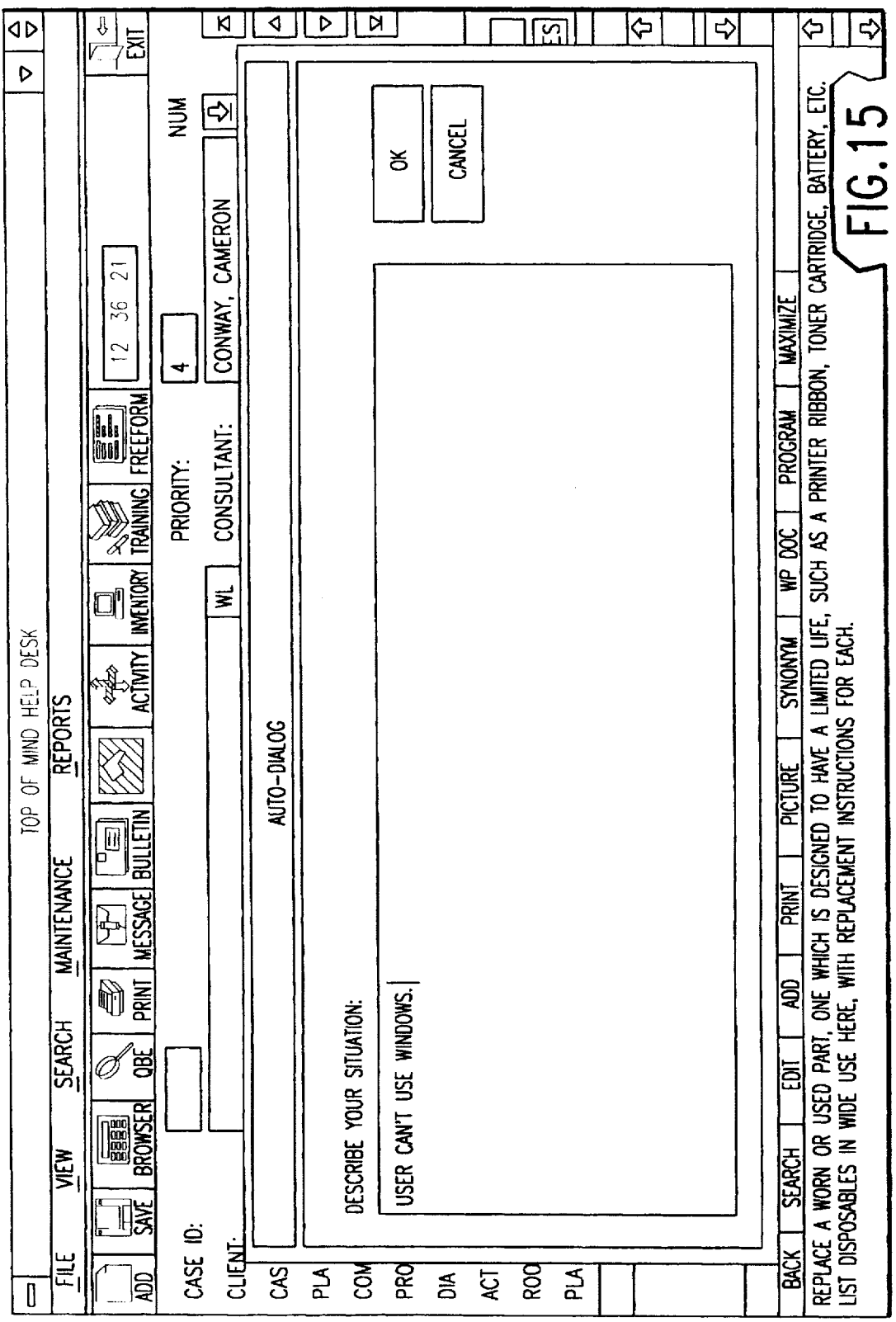

FIGS. 15 through 18 illustrates another application of the text activation process and how it affects the weightings in the adaptive learning system. In FIG. 15, the analyst enters freeform text describing a new user problem, "User can't start Windows." Clearly, Windows is a component that will Be important in this instance, and the problem relates to a function called starting. The adaptive learning system is capable of accepting this stream of text and parsing it to find relevant terms. It then introduces these text strings to the concept table in the knowledge cube, resulting in text and synonym activations. These are shown in FIG. 16. Three separate concepts, two problem concepts and one diagnosis, are most strongly activated, and the activations are predominantly text activations. These are followed, in descending order of overall strength, by a series of concepts activated exclusively by synonym, and so on.

Figure 17:
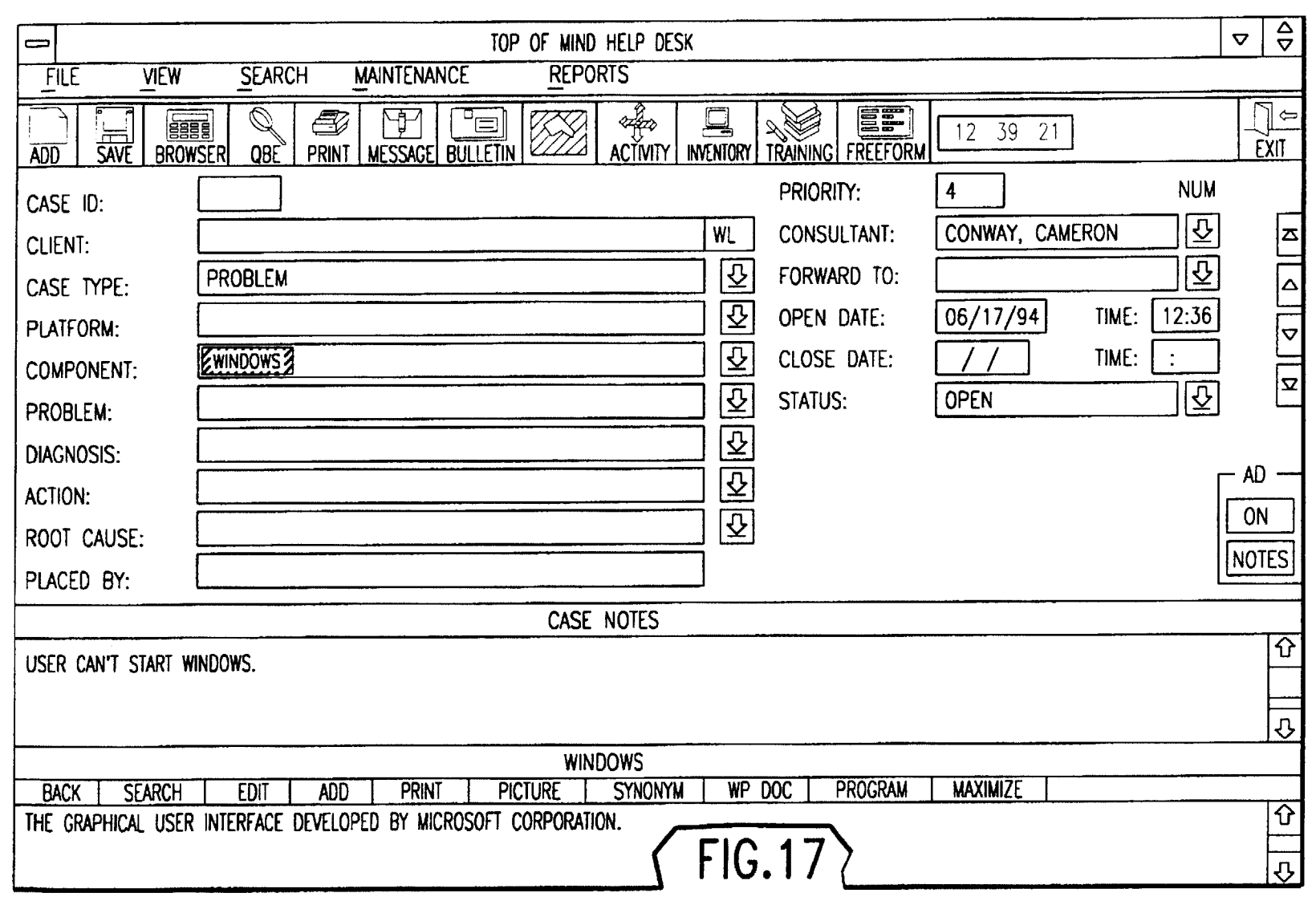

In FIG. 17, the analyst has introduced a concept activation by selecting the component Windows. Providing the concept activation results in cycle activations, in this case activating a large number of concepts that have been associated with Windows in past experience.

Figure 18:
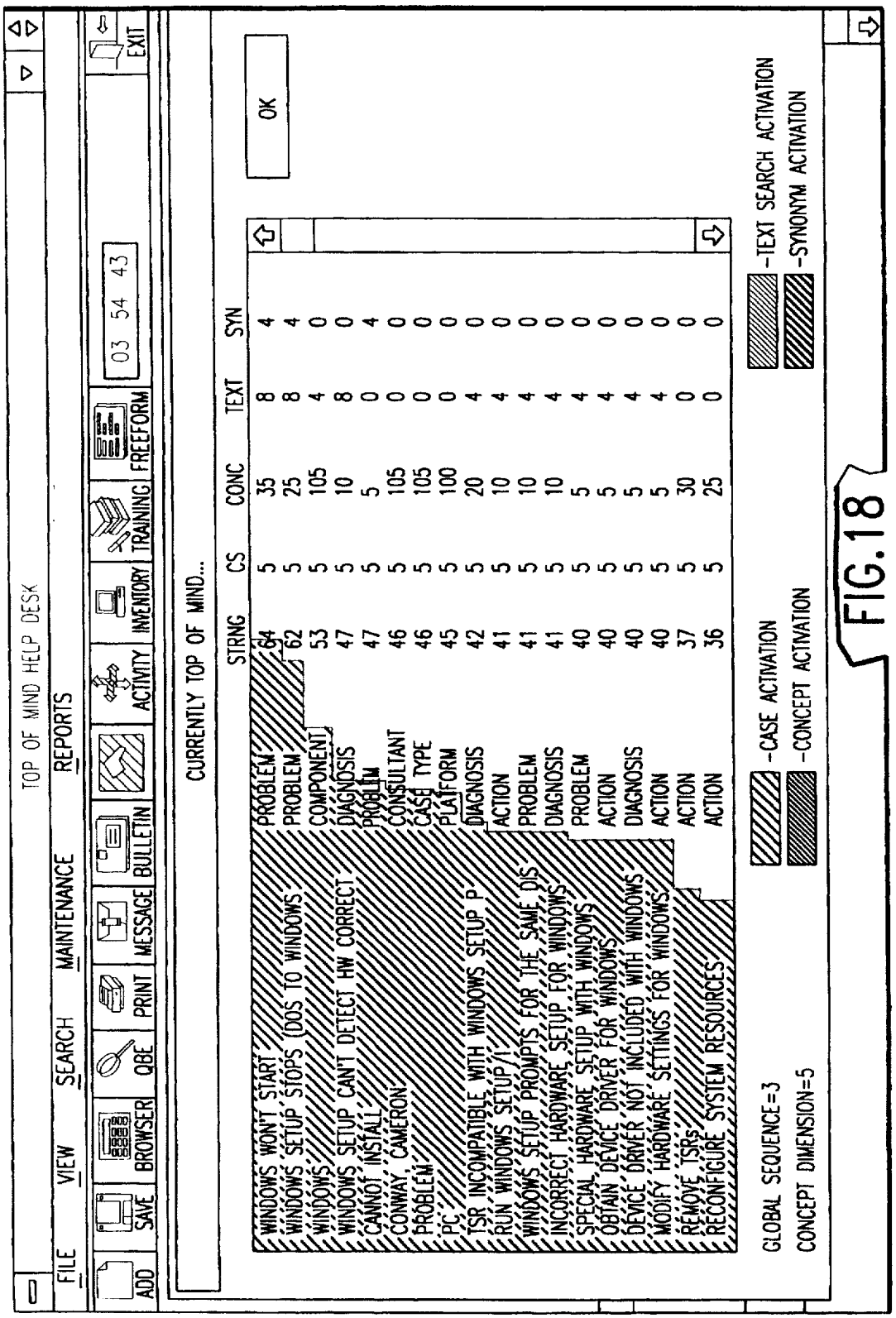

FIG. 18 shows how the concept activations in Top Of Mind memory are affected. Overall strengths of the activated concepts at the top of the list are much higher than in FIG. 16, and all of the activations shown are shown as concept activations. Also apparent from the data in FIG. 18 is the difference in the weight given to some types of concepts versus others in calculating the total strength of activation. The table shows 105 concept activations for the component Windows, a particular consultant who has dealt with Windows problems in the past, and the case type problem. However, the problem concepts, with far fewer concept activations, are more strongly activated.

As will be apparent to those skilled in the art, numerous variations of the above-described methods and apparatus may be practiced within the spirit and scope of the invention. Of particular importance, it should be noted that the invention may be practiced in many different environments and not just a help desk, that activations on concepts, cases, text and synonyms are only illustrative, and that other scoring systems and evaluating algorithms may be used.

What is claimed is:

1. A method of storing and retrieving data in a computer system comprising the steps of:

abstracting the data into generic concepts, storing in the memory of the computer system a set of cases, each case comprising one or more of said concepts, retrieving from the computer system an ordered ranking of one or more concepts related to a query by:
  comparing the query with the contents of the memory, and
  evaluating a strength of association of the query with the concepts stored in the memory, wherein the step of evaluating a strength of association of the query with the concepts stored in memory comprises the steps of:
    comparing the query with the concepts previously stored in the memory,
    for each case where a match occurs between the query and a concept of the case, activating all the concepts in that case,
    accumulating the number of activations of each concept and the number of queries for which the concept was activated, and
    combining the number of activations and the number of queries for which the concept was activated to determine the strength of association between the query and the stored concepts.

2. The method of claim 1 wherein the query is free text.

3. The method of claim 1 wherein the query is a concept.

4. The method of claim 3 further comprising the steps of:
organizing the concepts into a limited number of types, and
identifying the query as relating to a particular type.

5. The method of claim 1 wherein the query is free text and/or a concept.

6. The method of claim 1 further comprising the step of storing in memory a lookup table which for each concept identifies the cases in which the concept is found.

7. The method of claim 6 wherein the step of comparing the query with the concepts is performed by comparing the query with the concepts in the lookup table.

8. The method of claim 7 wherein each concept has an identifier number and the step of storing a set of cases in memory comprises the step of forming in memory a table in which for each case the identifier numbers of the concepts in the case are grouped together.

9. The method of claim 8 wherein the step of activating all the concepts in a case includes the steps of:

identifying from the lookup table a case which includes a concept that matches with a query, and reading from the case table the concept identifier numbers of each concept in the case identified from the lookup table.

10. The method of claim 1 wherein each concept has an identifier number and the step of storing a set of cases in memory comprises the step of forming in memory a table in which for each case the identifier numbers of the concepts in the case are grouped together.

11. A method of operating an adaptive learning system comprising the steps of:

generalizing specific events, actions, people, things and other entities so as to form a series of concepts, storing the concepts in a computer memory, retrieving from the computer memory associated concepts and providing them to a second computer memory, and ordering the retrieved concepts in the second computer memory on the strength of their association, wherein the concepts are stored in computer memory in cases of associated concepts and the step of ordering the retrieved concepts on the strength of their association comprises the steps of:

comparing a query with the concepts previously stored in the memory, for each case where a match occurs between the query and a concept of the case, activating all the concepts in that case, accumulating the number of activations of each concept and the number of queries for which the concept was activated, and combining the number of activations and the number of queries for which the concept was activated to determine the strength of association between the query and the stored concepts.

12. The method of claim 11 further comprising the step of storing in memory a lookup table which for each concept identifies the cases in which the concept is found.

13. The method of claim 12 wherein the step of comparing the query with the concepts is performed by comparing the query with the concepts in the lookup table.

14. The method of claim 13 wherein each concept has an identifier number and each case is stored in computer memory as a grouping of the identifier numbers of the associated concepts.

15. The method of claim 14 wherein each case is a linked list of concept identifier numbers.

16. The method of claim 14 wherein the step of activating all the concepts in a case includes the steps of:

identifying from the lookup table a case which includes a concept that matches a query; and reading from the case table the concept identifier numbers of each concept in the case identified from the lookup table.

17. The method of claim 11 wherein the step of activating all the concepts in a case includes the steps of:

identifying from the lookup table a case which includes a concept that matches a query; and reading from the case table the concept identifier numbers of each concept in the case identified from the lookup table.

18. The method of claim 11 wherein the query is free text.

19. The method of claim 11 wherein the query is a concept.

20. A method of operating an adaptive learning system stored in a computer comprising the steps of:

inputting into the computer a case comprising a plurality of associated concepts, for each concept of the case that is inputted, comparing the concept with all the concepts in previously stored cases in the learning system, for each concept in a case where a match occurs between a concept of the case that is being inputted and a concept of the case stored in the learning system, evaluating a strength of association of the inputted case with the concepts stored in the learning system, and ordering the concepts stored in the learning system in accordance with said evaluated strength of association, wherein the strength of association is evaluated by accumulating at least first and second scores, the first score being the number of times that there is a match between a concept of the case that is being inputted and one of the concepts in the previously stored cases, and the second score being the number of concepts in the case being inputted which caused an increase in the first score.

21. The method of claim 20 further comprising the step of storing in memory a lookup table which for each concept identifies the cases in which the concept is found.

22. The method of claim 21 wherein the step of comparing the concept being inputted with the concepts previously stored is performed by comparing the concept being inputted with the concepts in the lookup table.

23. The method of claim 22 wherein each concept has an identifier number and each case is stored in computer memory as a grouping of the identifier numbers of the associated concepts.

24. The method of claim 23 wherein each case is a linked list of concept identifier numbers.

25. The method of claim 23 wherein the first score is accumulated by:

identifying from the lookup table each case which includes a concept that matches the concept being inputted, and for all the concepts in all the cases that include a concept that matches the concept being inputted, counting the number of times each concept is found in such cases.

26. The method of claim 20 wherein the first score is accumulated by:

identifying from the lookup table each case which includes a concept that matches the concept being inputted, and for all the concepts in all the cases that include a concept that matches the concept being inputted, counting the number of times each concept is found in such cases.

27. The method of claim 20 wherein the case that is inputted also comprises at least one instance of free text that is compared with all the concepts in previously stored cases in the learning system.

28. The method of claim 20 further comprising the step of displaying the ordered concepts for use in selecting the next concept to be inputted.

29. The method of claim 20 further comprising the step of adding the case being inputted to the previously stored cases in the learning system.

30. An adaptive learning system comprising:

storage means for storing information received from a user, the information received from a user being abstracted into generalized concepts and organized into sets of associated concepts, the storage means comprising means for storing a record of the concepts and means for storing a record of the sets of associated concepts, a processor coupled to the storage means for calculating the degree of association between one or more concepts or free text specified at an input to the system and the concepts stored in the storage means and forming lists of concepts ordered in accordance with their degree of association, means for activating all the concepts in a set when a match occurs between a concept or free text specified at an input to the system and one of the concepts in the set, and means for counting the number of times each concept is activated.

31. The learning system of claim 30 further comprising a lookup table stored in memory which for each concept identifies the cases in which the concept is found.

32. The learning system of claim 30 wherein each concept has an identifier number and the record of sets of associated concepts is stored in memory in the form of a table which for each set groups together the identifier numbers of the concepts in that set.

33. The learning system of claim 32 wherein the processor includes means for comparing concepts or free text specified at an input to the system with concepts stored in the storage means.

34. The learning system of claim 30 configured to provide a help desk in which the concepts comprise identification of a problem, identification of a diagnosis and identification of action to be taken to correct the problem.

35. The learning system of claim 34 wherein the help desk advances through a case from problem, to diagnosis, to corrective action and the lists of concepts are provided to the help desk user to prompt his selection of a problem, a diagnosis and/or corrective action.

36. The learning system of claim 30 further comprising at least one additional storage means and processor, each storage means and processor constituting a user terminal, the user terminal being connected together by a network.

37. The learning system of claim 36 further comprising a file server connected to the user terminals via the network, the file server maintaining a record of the concepts and a record of the sets of associated concepts.

38. An adaptive learning system comprising:

storage means for storing information received from a user, said information being abstracted into generalized concepts and organized into cases of associated concepts, the storage means comprising means for storing a concept table which for each concept associates a concept name with an identifier number and a case table which for each case associates a case identifier with the identifier numbers of its associated concepts, a processor coupled to the storage means for calculating the degree of association between one or more concepts or free text specified at an input to the system and the concepts stored in the storage means, means for activating all the concepts in a case when a match occurs between a concept or free text specified at an input to the system and one of the concepts in the case, and means for counting the number of times each concept is activated.

39. The learning system of claim 38 wherein the storage means further comprises means for storing a lookup table which for each concept identifies the cases in which the concept is found.

40. The learning system of claim 38 wherein the processor includes means for comparing concepts or free text specified at an input to the system with concepts stored in the storage means.

41. The learning system of claim 38 configured to provide a help desk in which the concepts comprise identification of a problem, identification of a diagnosis and identification of action to be taken to correct the problem.

42. The learning system of claim 41 wherein the help desk advances through a case from problem, to diagnosis, to corrective action and the lists of concepts are provided to the help desk user to prompt his selection of a problem, a diagnosis and/or corrective action.

43. The learning system of claim 38 further comprising at least one additional storage means and processor, each storage means and processor constituting a user terminal, the user terminal being connected together by a network.

44. The learning system of claim 43 further comprising a file server connected to the user terminals via the network, the file server maintaining a record of the concepts and a record of the sets of associated concepts.

45. A method of storing and retrieving data in a computer system comprising the steps of:

abstracting the data into generic concepts, storing in the memory of the computer system a set of cases, each case comprising one or more of said concepts, retrieving from the computer system an ordered ranking of one or more concepts related to a query by:

comparing the query with the contents of the memory, and evaluating a strength of association of the query with the concepts stored in the memory, wherein the step of evaluating a strength of association of the query with the concepts stored in memory comprises the steps of:

comparing the query with the concepts previously stored in th e memory, and for each concept in a case where a match occurs between the query and the concept of the case stored in the computer system, accumulating at least first and second scores related to such match, and combining said scores.

46. The method of claim 45 the first score being the number of times that there is a match between the query and one of the concepts in the previously stored cases, and the second score being the number of queries which caused an increase in the first score.

47. A method of storing and retrieving data in a computer system comprising the steps of:

abstracting the data into generic concepts, storing in the memory of the computer system a set of cases, each case comprising one or more of said concepts, retrieving from the computer system an ordered ranking of one or more concepts related to a query by:

comparing the query with the contents of the memory, and evaluating a strength of association of the query with the concepts stored in the memory, wherein the step of evaluating a strength of association of the query with the concepts stored in memory comprises the steps of:

comparing the query with the concepts previously stored in the memory, for each case where a match occurs between the query and a concept of the case, activating all the concepts in that case, and scoring the activated concepts.

48. A method of operating an adaptive learning system comprising the steps of:

generalizing specific events, actions, people, things and other entities so as to form a series of concepts, storing the concepts in a computer memory, retrieving from the computer memory associated concepts and providing them to a second computer memory, and ordering the retrieved concepts in the second computer memory on the strength of their association, wherein the concepts are stored in computer memory in cases of associated concepts and the step of ordering the retrieved concepts on the strength of their association comprises the steps of:

comparing a query with the concepts previously stored in the memory, for each case where a match occurs between the query and a concept of the case, activating all the concepts in that case, and scoring the activated concepts.

49. A method of operating an adaptive learning system comprising the steps of:

generalizing specific events, actions, people, things and other entities so as to form a series of concepts, storing the concepts in a computer memory, retrieving from the computer memory associated concepts and providing them to a second computer memory, and ordering the retrieved concepts in the second computer memory on the strength of their association, wherein the step of ordering the retrieved concepts on the strength of their association comprises the steps of:

comparing a query with the concepts previously stored in the memory, and for each concept where a match occurs between the query and a stored concept in the computer system, accumulating at least first and second scores related to such match, and combining said scores.

50. The method of claim 49, wherein the first score being the number of times that there is a match between the query and one of the previously stored concepts, and the second score being the number of queries which caused an increase in the first score.

51. A method of operating an adaptive learning system stored in a computer comprising the steps of:

inputting into the computer a case comprising a plurality of associated concepts, for each concept of the case that is inputted, comparing the concept with all the concepts in previously stored cases in the learning system, for each concept in a case where a match occurs between a concept of the case that is being inputted and a concept of the case stored in the learning system, evaluating a strength of association of the inputted case with the concepts stored in the learning system, and ordering the concepts stored in the learning system in accordance with said evaluated strength of association, wherein the step of evaluating the strength of the association comprises the step of:

activating all the concepts in a stored case where a match occurs between a concept being inputted and a concept in the stored case.

52. A method of operating an adaptive learning system stored in a computer comprising the steps of:

inputting into the computer a case comprising a plurality of associated concepts, for each concept of the case that is inputted, comparing the concept with all the concepts in previously stored cases in the learning system, for each concept in a case where a match occurs between a concept, of the case that is being inputted and a concept of the case stored in the learning system, evaluating a strength of association of the inputted case with the concepts stored in the learning system, and ordering the concepts stored in the learning system in accordance with said evaluated strength of association, wherein the step of evaluating the strength of the association comprises the step of:

activating all the concepts in a stored case where a match occurs between a concept being inputted and a concept in the stored case; wherein the step of evaluating the strength of the association further comprises the steps of:

accumulating the number of activations of each concept and the number of cases being inputted for which the concept in the stored case was activated, and combining the number of activations and the number of cases being inputted for which the concept in the stored case was activated to determine the strength of association between the concept being inputted and the stored concepts.

53. The method of claim 52 further comprising the step of storing in memory a lookup table which for each concept identifies the cases in which the concept is found.

54. The method of claim 53 wherein the step of comparing the concept being inputted with the concepts previously stored is performed by comparing the concept being inputted with the concepts in the lookup table.

55. The method of claim 54 wherein each concept has an identifier number and each case is stored in computer memory as a grouping of the identifier numbers of the associated concepts.

56. The method of claim 55 wherein each case is a linked list of concept identifier numbers.

57. The method of claim 56 wherein the number of activations is accumulated by:

identifying from the lookup table each case which includes a concept that matches the concept being inputted, and for all the concepts in all the cases that include a concept that matches the concept being inputted, counting the number of times each concept is found in such cases.

58. A method of operating an adaptive learning system stored in a computer comprising the steps of:

inputting into the computer a case comprising a plurality of associated concepts, for each concept of the case that is inputted, comparing the concept with all the concepts in previously stored cases in the learning system, for each concept in a case where a match occurs between a concept of the case that is being inputted and a concept of the case stored in the learning system, evaluating a strength of association of the inputted case with the concepts stored in the learning system, and ordering the concepts stored in the learning system in accordance with said evaluated strength of association, wherein the strength of association is evaluated by accumulating at least first and second scores, and combining said scores.

59. An adaptive learning system comprising:

storage means for storing information received from a user, the information received from a user being abstracted into generalized concepts and organized into sets of associated concepts, the storage means comprising means for storing a record of the concepts and means for storing a record of the sets of associated concepts, a processor coupled to the storage means for calculating the degree of association between one or more concepts or free text specified at an input to the system and the concepts stored in the storage means and forming lists of concepts ordered in accordance with their degree of association, and a lookup table stored in memory which for each concept identifies the cases in which the concept is found.

60. An adaptive learning system comprising:

storage means for storing information received from a user, said information being abstracted into generalized concepts and organized into cases of associated concepts, the storage means comprising means for storing a concept table which for each concept associates a concept name with an identifier number and a case table which for each case associates a case identifier with the identifier numbers of its associated concepts, a processor coupled to the storage means for calculating the degree of association between one or more concepts or free text specified at an input to the system and the concepts stored in the storage means, wherein the storage means further comprises means for storing a lookup table which for each concept identifies the cases in which the concept is found.

61. A method of storing and retrieving data in a computer system comprising the steps of:

abstracting the data into generic concepts, storing in the memory of the computer system a set of cases, each case comprising one or more of said concepts, retrieving from the computer system an ordered ranking of one or more concepts related to a query by:

comparing the query with the contents of the memory, and evaluating a strength of association of the query with the concepts stored in the memory.

\* \* \* \* \*

UNITED STATES PATENT AND TRADEMARK OFFICE
CERTIFICATE OF CORRECTION

PATENT NO. : 5,787,234

DATED : July 28, 1998

INVENTOR(S) : Bruce G. Molloy

Page 1 of 2

It is certified that error appears in the above-identified patent and that said Letters Patent is hereby corrected as shown below:

Column 5, line 5: change "queries" to --query elements--.

Claim 1, line 41: change "queries" to --query elements--.

Claim 1, line 44: change "queries" to --query elements--.

Claim 3, line 48: change "a" to --at least one--.

Claim 5, line 54: change "a" to --at least one--.

Claim 11, line 31: change "queries" to --query elements--.

Claim 11, line 34: change "queries" to --query elements--.

Claim 19, line 64: change "a" to --at least one--.

Claim 20, line 9: change "case" to --concept--.

Claim 20, line 16: change "a concept" to --the concept--.

UNITED STATES PATENT AND TRADEMARK OFFICE
CERTIFICATE OF CORRECTION

PATENT NO. : 5,787,234
DATED : July 28, 1998
INVENTOR(S) : Bruce G. Molloy

It is certified that error appears in the above-identified patent and that said Letters Patent is hereby corrected as shown below:

Claim 46, line 49: change "queries" to --query elements--.

Claim 50, line 44: change "queries" to --query elements--.

Claim 51, line 57: change "inputted case" to --inputted concept--.

Claim 51, line 64: change the first instance of "a concept" to --the concept--.

Claim 52, line 9: change "inputted case" to --inputted concept--.

Claim 52, line 16: change "a concept" to --the concept--.

Claim 52, line 21: change "cases" to --concepts--.

Claim 52, line 25: change "cases" to --concepts--.

Claim 58, line 61: change "inputted case" to --inputted concept--.

Signed and Sealed this

Tenth Day of November 1998

Attest:

BRUCE LEHMAN

*Attesting Officer*  *Commissioner of Patents and Trademarks*